(12) United States Patent
Weir et al.

(10) Patent No.: US 8,670,934 B2
(45) Date of Patent: Mar. 11, 2014

(54) JOURNEY DESTINATION ENDPOINT DETERMINATION

(75) Inventors: David Frank Russell Weir, San Jose, CA (US); Roger Melen, Los Altos Hills, CA (US)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 2 days.

(21) Appl. No.: 13/328,786

(22) Filed: Dec. 16, 2011

(65) Prior Publication Data

US 2013/0158866 A1      Jun. 20, 2013

(51) Int. Cl.
 *G01C 21/00* (2006.01)
(52) U.S. Cl.
 USPC .......................................................... 701/468
(58) Field of Classification Search
 USPC .............. 340/988, 991–994; 701/400, 23, 25, 701/408–412, 425–426, 438, 468
 See application file for complete search history.

(56) References Cited

U.S. PATENT DOCUMENTS

2008/0027639 A1   1/2008   Tryon
2012/0098677 A1*  4/2012   Geelen ....................... 340/932.2

* cited by examiner

*Primary Examiner* — Yonel Beaulieu
(74) *Attorney, Agent, or Firm* — Patent Law Works LLP

(57) ABSTRACT

A system and method for establishing a journey destination endpoint is disclosed. The system comprises a communication module, a stop classification module and an endpoint establishment module. The communication module receives a stream of data including a first data element and a second data element from a global positioning system. The communication module receives a set of sensor data from one or more sensors. The stop classification module detects a stop for a traveling vehicle based at least in part on the stream of data and the set of sensor data. The stop classification module applies one or more metric criteria to the first data element and the second data element to determine a type of the stop. The endpoint establishment module establishes a journey destination endpoint based on the type of the stop. The endpoint establishment module associates the journey destination endpoint with retrieval identification data.

23 Claims, 31 Drawing Sheets

1800

| Time in Minutes | Time of Day |
|---|---|
| 0-299 (Midnight to 4:59:59 am) | Midnight (1) |
| 300-659 (5:00:00 am to 10:59:59 am) | Morning (2) |
| 660-839 (11:00:00 am to 1:59:59 pm) | Lunch (3) |
| 840-1199 (2:00:00 pm to 7:59:59 pm) | Afternoon (4) |
| 1200 to 1439 (8:00:00 pm to 11:59:59 pm) | Night (5) |

1830

| Time in Minutes | Duration |
|---|---|
| 0-14 | Short (0) |
| 15-29 | Medium (1) |
| ≥30 | Long (3) |

1850

1900

| Table Name | Table Type | Parameter Stored |
|---|---|---|
| destTable | Probability Table | Destination ID |
| originTable | Conditional probability table | Origin ID and destination ID |
| dowTable | Conditional probability table | Day of week and destination ID |
| todTable | Conditional probability table | Time of day and destination ID |
| orig_1Table | Conditional probability table | Previous origin ID and destination ID |
| orig_2Table | Conditional probability table | Origin before previous origin and destination ID |
| durationTable | Conditional probability table | Duration and destination ID |
| dirTable | Conditional probability table | Direction and destination ID |
| dPOITable | Conditional probability table | Destination POI and destination ID |
| woyTable | Conditional probability table | Week of year, origin ID and destination ID |
| todCondTable | Joint conditional probability table | Time of day, origin ID and destination ID |
| dirCondTable | Joint conditional probability table | Direction, origin ID and destination ID |
| durTable | Joint conditional probability table | Duration, origin and destination ID |

| | Destination | | | |
|---|---|---|---|---|
| | Work | Home | Gym | Gas Station |
| Frequency | 30 | 40 | 20 | 10 |

| | | Destination | | | |
|---|---|---|---|---|---|
| | | Work | Home | Gym | Gas Station |
| Time of Day | Midnight | 0 | 0 | 0 | 0 |
| | Morning | 28 | 0 | 3 | 0 |
| | Lunch | 2 | 5 | 2 | 0 |
| | Afternoon | 0 | 35 | 5 | 5 |
| | Night | 0 | 0 | 10 | 5 |

| | Destination | | | |
|---|---|---|---|---|
| | Work | Home | Gym | Gas Station |
| Probability | 0.3 | 0.4 | 0.2 | 0.1 |

Figure 19D

JOURNEY DESTINATION ENDPOINT DETERMINATION

BACKGROUND

The specification relates to navigation systems. In particular, the specification relates to a system and method for determining a journey destination endpoint in a journey.

A navigation system such as a global positioning system (GPS) is helpful for a user who is driving a vehicle on a road. The user may obtain all kinds of information from the navigation system such as a route to a destination, local traffic conditions, locations of restaurants, estimated time of arrival, the speed limit on the road, estimated journey duration, etc. However, existing navigation systems have been proven deficient and have numerous problems.

First, existing navigation systems require a user to enter a destination for a journey before providing any driving information to the user such as a route to the destination, driving instructions for the journey, estimated time of arrival, etc. Existing navigation systems fail to predict destinations for journeys that the user is going to take and therefore fail to provide the driving information if the user does not input the destination.

Second, existing navigation systems fail to provide a mechanism to delete obsolete data stored in the systems. For example, existing navigation systems fail to automatically delete obsolete destinations from past journeys (e.g., destinations that the user has not been to for several years) and data associated with the obsolete destinations, which might cause the systems to run out of storage space especially when a very limited storage space is available in the systems.

SUMMARY OF THE INVENTION

The specification overcomes the deficiencies and limitations of the prior art at least in part by providing a system and method for determining a journey destination endpoint in a journey. The system comprises a communication module, a stop classification module and an endpoint establishment module. The communication module receives a stream of data from a global positioning system (GPS). The communication module receives a set of sensor data from one or more sensors. The steam of data includes a first data element describing a first geographic position and a first timestamp of a traveling vehicle and a second data element describing a second geographic position and a second timestamp of the traveling vehicle. The stop classification module detects a stop for the traveling vehicle based at least in part on the stream of data and the set of sensor data. The stop classification module applies one or more metric criteria to the first data element and the second data element to determine a type of the stop. The endpoint establishment module establishes a journey destination endpoint based at least in part on the type of the stop. The endpoint establishment module associates the journey destination endpoint with retrieval identification data.

BRIEF DESCRIPTION OF THE DRAWINGS

The specification is illustrated by way of example, and not by way of limitation in the figures of the accompanying drawings in which like reference numerals are used to refer to similar elements.

FIG. 19A is a graphical representation of a table listing one or more metric tables according to one embodiment.

FIGS. 19B-19D are graphical representations illustrating a metric table according to various embodiments.

DETAILED DESCRIPTION OF THE PREFERRED EMBODIMENTS

Figure 1:
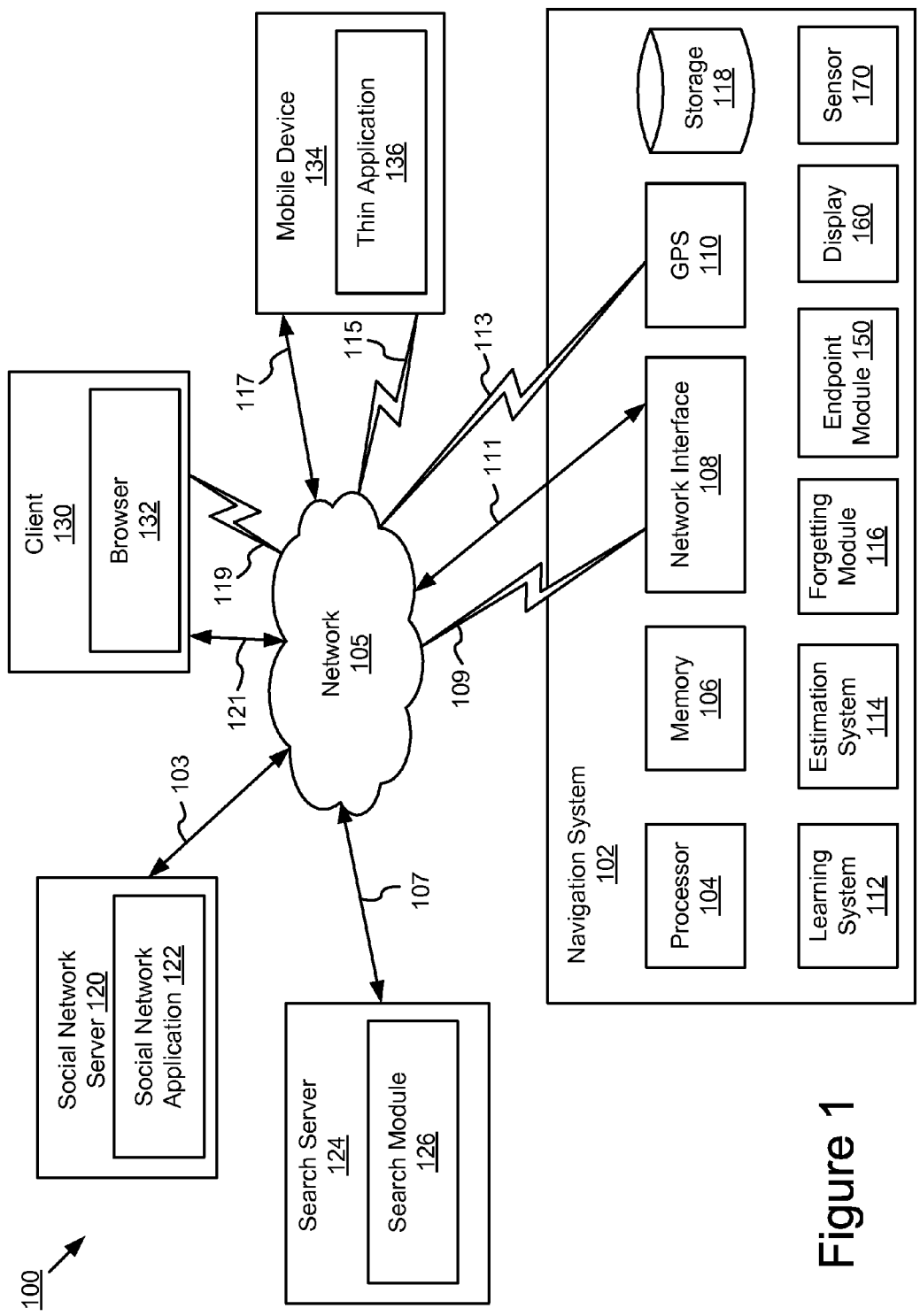
FIG. 1 is a high-level block diagram illustrating a system for estimating one or more potential journeys to one or more destinations according to one embodiment.

A system and method for determining a journey destination endpoint in a journey is described below. In the following description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, compact disc read-only memories (CD-ROMs), magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for estimating one or more potential journeys to one or more destinations according to one embodiment. The illustrated system 100 includes a navigation system 102, a social network server 120, a search server 124, a client device 130 and a mobile device 134. These entities of the system 100 are communicatively coupled to each other. In the illustrated embodiment, these entities are communicatively coupled via a network 105.

While FIG. 1 illustrates one navigation system 102, one social network server 120, one search server 124, one client device 130 and one mobile device 134, the description applies to any system architecture having any number of navigation systems 102, social network servers 120, search servers 124, client devices 130 and mobile devices 134. Furthermore, while only one network 105 is coupled to the navigation system 102, the social network server 120, the search server 124, the client device 130 and the mobile device 134, in practice any number of networks 105 can be connected to the entities.

In the illustrated embodiment, the social network server 120 is communicatively coupled to the network 105 via signal line 103. The search server 124 is communicatively coupled to the network 105 via signal line 107. The client 130 is communicatively coupled to the network 105 via one or more of signal lines 119 and 121. The mobile device 134 is communicatively coupled to the network 105 via one or more of signal lines 115 and 117. The navigation system 102 is communicatively coupled to the network 105 via one or more of signal lines 109, 111 and 113. In one embodiment, a network interface 108 comprised within the navigation system 102 is communicatively coupled to the network 105 via one or more of signal lines 109 and 111. A global positioning system (GPS) 110 comprised within the navigation system 102 is communicatively coupled to the network 105 via signal line 113. In one embodiment, each of signal lines 103, 107, 111, 117 and 121 represents one of a wired connection (e.g., a connection via a cable) and a wireless connection (e.g., a wireless local area network (LAN) connection). Each of signal lines 109, 113, 115 and 119 represents a wireless connection (e.g., a wireless LAN connection, a satellite connection, etc.).

The network 105 is a conventional type of network, wired or wireless, and may have any number of configurations such as a star configuration, token ring configuration or other configurations known to those skilled in the art. In one embodiment, the network 105 comprises one or more of a local area network (LAN), a wide area network (WAN) (e.g., the Internet) and/or any other interconnected data path across which multiple devices communicate. In another embodiment, the network 105 is a peer-to-peer network. The network 105 is coupled to or includes portions of a telecommunications network for sending data in a variety of different communication protocols. For example, the network 105 is a 3G network or a 4G network. In yet another embodiment, the network 105 includes Bluetooth® communication networks or a cellular communications network for sending and receiving data such as via short messaging service (SMS), multimedia messaging service (MMS), hypertext transfer protocol (HTTP), direct data connection, wireless application protocol (WAP), email, etc. In yet another embodiment, all or some of the links in the network 105 are encrypted using conventional encryption technologies such as secure sockets layer (SSL), secure HTTP and/or virtual private networks (VPNs).

The navigation system 102 is a system for providing navigation information. For example, the navigation system 102 is an on-board navigation system embedded in a vehicle. The navigation system 102 includes a processor 104, a memory 106, a network interface 108, a GPS 110, a learning system 112, an estimation system 114, a forgetting module 116, a storage device 118, an endpoint module 150, a sensor 170 and a display 160. Although only one processor 104, one memory 106, one network interface 108, one GPS 110, one learning system 112, one estimation system 114, one forgetting module 116, one storage device 118, one endpoint module 150, one sensor 170 and one display 160 are illustrated, one skilled in the art will recognize that any number of these components are available in the navigation system 102. One skilled in the art will also appreciate that the navigation system 102 may include any other components not shown in FIG. 1 such as an input device, an audio system and other components conventional to a navigation system.

The processor 104 comprises an arithmetic logic unit, a microprocessor, a general purpose controller or some other processor array to perform computations, retrieve data stored on the storage device 118, etc. The processor 104 processes data signals and may comprise various computing architectures including a complex instruction set computer (CISC) architecture, a reduced instruction set computer (RISC) architecture, or an architecture implementing a combination of instruction sets. Although only a single processor is shown in FIG. 1, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 106 stores instructions and/or data that may be executed by the processor 104. The instructions and/or data may comprise code for performing any and/or all of the techniques described herein. The memory 106 may be a dynamic random access memory (DRAM) device, a static random access memory (SRAM) device, flash memory or some other memory device known in the art. In one embodiment, the memory 106 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The network interface 108 is an interface for connecting the navigation system 102 to a network. For example, the network interface 108 is a network adapter that connects the navigation system 102 to the network 105. The network interface 108 is communicatively coupled to the network 105 via one or more of signal lines 111 and 109. In one embodiment, the network interface 108 receives data from one or more of the social network server 120, the search server 124, the client 130 and the mobile device 134 via the network 105. The network interface 108 sends the received data to one or more components of the navigation system 102 (e.g., the learning system 112, the estimation system 114, etc.). In another embodiment, the network interface 108 receives data from one or more components of the navigation system 102 and sends the data to one or more of the social network server 120, the search server 124, the client 130 and the mobile device 134 via the network 105.

In one embodiment, the network interface 108 includes a port for direct physical connection to the network 105 or to another communication channel. For example, the network interface 108 includes a universal serial bus (USB), category 5 cable (CAT-5) or similar port for wired communication with the network 105. In another embodiment, the network interface 108 includes a wireless transceiver for exchanging data with the network 105, or with another communication channel, using one or more wireless communication methods, such as IEEE 802.11, IEEE 802.16, BLUETOOTH®, near field communication (NFC) or another suitable wireless communication method. In one embodiment, the network interface 108 includes a NFC chip that generates a radio frequency (RF) for short-range communication.

The GPS 110 is a system for providing location data and timestamp data. For example, the GPS 110 is a conventional GPS that locates a vehicle in real time and provides timestamp data describing the current time. In one embodiment, the GPS 110 sends the location data and the timestamp data to one or more of the learning system 112, the estimation system 114 and the forgetting module 116. One skilled in the art will recognize that the GPS 110 may provide driving information (e.g., driving instructions to a destination, estimated time of arrival, etc.) and other information such as information about gas stations, restaurants, hotels, etc., to a user.

In one embodiment, the GPS 110 sends a stream of data to the endpoint module 150. The stream of data includes one or more data elements. A data element includes data describing a geographic position of a traveling vehicle and timestamp data describing a timestamp (e.g., 2:00:00 pm, Wednesday, Nov. 30, 2011) when the traveling vehicle is at the geographic position. For example, the stream of data includes: (1) a first data element describing a first geographic position of a traveling vehicle and a first timestamp when the traveling vehicle was at the first geographic position; and (2) a second data element describing a second geographic position of the traveling vehicle and a second timestamp when the traveling vehicle was at the second geographic position. In one embodiment, the second data element occurs after the first data element in the stream of data. For example, the second data element immediately follows the first data element in the stream of data.

The learning system 112 is code and routines for processing driver history data. In one embodiment, the learning system 112 includes code and routines stored in an on-chip storage (not pictured) of the processor 104. In another embodiment, the learning system 112 is implemented using hardware such as a field-programmable gate array (FPGA) or an application-specific integrated circuit (ASIC). In yet another embodiment, the learning system 112 is implemented using a combination of hardware and software. The learning system 112 is described below in more detail with reference to FIGS. 2, 5 and 9A-14C.

The driver history data is data describing one or more past journeys taken by a user. For example, the driver history data includes data associated with one or more past journeys such as start points, departure data (e.g., time of departure, day of departure, week of departure and date of departure, etc.), direction data, duration data, end points, arrival data (e.g., time of arrival, day of arrival, week of arrival and date of arrival, etc.), point of interest (POI) data for the end points, etc. In one embodiment, the driver history data describes one or more past destinations and estimated destinations for potential journeys. A destination for a past journey is referred to as a past destination. A destination for a potential journey is referred to as an estimated destination. A potential journey is a journey that a user is likely to take. The estimated destinations are generated from the one or more past destinations as described below with reference to FIG. 2. The driver history data is described below in more detail with reference to FIG. 3.

The estimation system 114 is code and routines for estimating a destination for a journey. In one embodiment, the estimation system 114 includes code and routines stored in an on-chip storage (not pictured) of the processor 104. In another embodiment, the estimation system 114 is implemented using hardware such as an FPGA or an ASIC. In yet another embodiment, the estimation system 114 is implemented using a combination of hardware and software. The estimation system 114 is described below in more detail with reference to FIGS. 4 and 9A-14C.

The forgetting module 116 is code and routines for deleting data from a memory of the navigation system 102. In one embodiment, the forgetting module 116 includes code and routines stored in an on-chip storage (not pictured) of the processor 104. In another embodiment, the forgetting module 116 is implemented using hardware such as an FPGA or an ASIC. In yet another embodiment, the forgetting module 116 is implemented using a combination of hardware and software. The forgetting module 116 is described below in more detail with reference to FIGS. 6 and 8A-8B.

The storage device 118 is a non-transitory memory that stores data. For example, the storage device 118 is a dynamic random access memory (DRAM) device, a static random access memory (SRAM) device, flash memory or some other memory device known in the art. In one embodiment, the storage device 118 also includes a non-volatile memory or similar permanent storage device and media such as a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device known in the art. The storage device 118 is described below in more detail with reference to FIG. 3.

The endpoint module 150 is code and routines that, when executed by the processor 104, determines a journey destination endpoint in a journey. The journey destination endpoint is described below in more detail with reference to FIG. 7. In one embodiment, the endpoint module 150 includes code and routines stored in an on-chip storage (not pictured) of the processor 104. In another embodiment, the endpoint module 150 is implemented using hardware such as an FPGA or an ASIC. In yet another embodiment, the endpoint module 150 is implemented using a combination of hardware and software. The endpoint module 150 is described below in more detail with reference to FIGS. 7, 15 and 16A-16D.

The display 160 is any device for displaying data to a user. For example, the display 160 is one of a touch screen display device, a liquid crystal display (LCD) and any other conventional display device known to one skilled in the art.

The sensor 170 is any type of conventional sensor configured to collect any type of data for a traveling vehicle. For example, the sensor 170 is one of the following: a light detection and ranging (LIDAR) sensor; an infrared detector; a motion detector; a thermostat; and a sound detector, etc. Persons having ordinary skill in the art will recognize that other types of sensors are possible. In one embodiment, the system 100 includes a combination of different types of sensors 170. For example, the system 100 includes a first sensor 170 for monitoring a system status of a traveling vehicle, a second sensor for monitoring a speed for the traveling vehicle, a third sensor for monitoring door activity for the traveling vehicle and a fourth sensor for monitoring window activity for the traveling vehicle. The sensor 170 sends sensor data describing a measurement of one or more of a system status of a traveling vehicle, a speed, door activity and window activity to the endpoint module 150.

The social network server 120 is any computing device having a processor (not pictured) and a computer-readable storage medium (not pictured) storing data for providing a social network to users. Although only one social network server 120 is shown, persons of ordinary skill in the art will recognize that multiple servers may be present. A social network is any type of social structure where the users are connected by a common feature, for example, Orkut. The common feature includes friendship, family, work, an interest, etc. The common features are provided by one or more social networking systems, such as those included in the system 100, including explicitly-defined relationships and relationships implied by social connections with other users, where the relationships are defined in a social graph. The social graph is a mapping of all users in a social network and how they are related to each other.

In the depicted embodiment, the social network server 120 includes a social network application 122. The social network application 122 includes code and routines stored on a memory (not pictured) of the social network server 120 that, when executed by a processor (not pictured) of the social network server 120, causes the social network server 120 to provide a social network accessible by a client device 130 and/or a mobile device 134 via the network 105. In one embodiment, a user publishes comments on the social network. For example, a user of the social network application 122 provides a status update and other users make comments on the status update. In another embodiment, a user in a vehicle interacts with the social network via a social feature added to the navigation system 102. For example, a user clicks on a social graphic such as a "share" button shown on a graphical user interface (GUI) presented by a display 160 of the navigation system 102 to share information about a journey in the social network (e.g., a start point, an end point, a route from the start point to the end point, etc., associated with the journey).

The search server 124 is any computing device having a processor (not pictured) and a computer-readable storage medium (not pictured) storing data for providing a search service to users. In the depicted embodiment, the search server 124 includes a search module 126. The search module 126 is code and routines for providing one or more search results to a user. In one embodiment, the search module 126 receives a query from a user via the network 105, searches a plurality of data sources (e.g., a data source included in the search server 124, a data source from the social network server 120, etc.) for one or more results matching to the query and sends the results to the user. For example, the search module 126 receives an input to search for reviews related to a local restaurant from a user operating on the navigation system 102. The search module 126 searches a plurality of data sources for matching results and sends the results to the navigation system 102 via the network 105, causing the display 160 to present the results to the user.

The client 130 is any computing device that includes a memory (not pictured) and a processor (not pictured). For example, the client 130 is a personal computer ("PC"), a cell phone (e.g., a smart phone, a feature phone, etc.), a tablet computer (or tablet PC), a laptop, etc. One having ordinary skill in the art will recognize that other types of clients 130 are possible. In one embodiment, the system 100 comprises a combination of different types of clients 130.

The client 130 comprises a browser 132. In one embodiment, the browser 132 is code and routines stored in a memory of the client 130 and executed by a processor of the client 130. For example, the browser 130 is a browser application such as Google Chrome, Mozilla Firefox, etc. In one embodiment, the browser 130 presents a GUI to a user on a display device (not pictured) of the client 130 and allows the user to input information via the GUI.

The mobile device 134 is any mobile computing device that includes a memory (not pictured) and a processor (not pictured). For example, the mobile device 134 is a cell phone (e.g., a smart phone, a feature phone, etc.), a tablet computer (or tablet PC), a laptop, etc. One having ordinary skill in the art will recognize that other types of mobile devices 134 are possible. In one embodiment, the system 100 comprises a combination of different types of mobile devices 134.

The mobile device 134 comprises a thin application 136. In one embodiment, the thin application 136 is code and routines stored in a memory of the mobile device 134 and executed by a processor of the mobile device 134. For example, the thin application 136 is an application that provides a GUI for a user to interact with the navigation system 102.

The system 100 is particularly advantageous since, for example, it is capable to provide a plurality of estimated destinations (or, potential journeys) to a user when the user starts the engine of a vehicle. The system 100 does not require the user to input a destination for a journey and automatically provides information about the potential journeys to the user in real time based at least in part on the driver history data stored in the system 100 as long as the GPS 110 has located itself. Furthermore, the system 100 continues to update the driver history data as the user takes new journeys and therefore continuously improves the journey estimations. The system 100 also deletes obsolete data associated with obsolete destinations to save storage space and minimize the influence of the obsolete data on the journey estimations as described below with reference to FIG. 6.

Learning System

Figure 2:
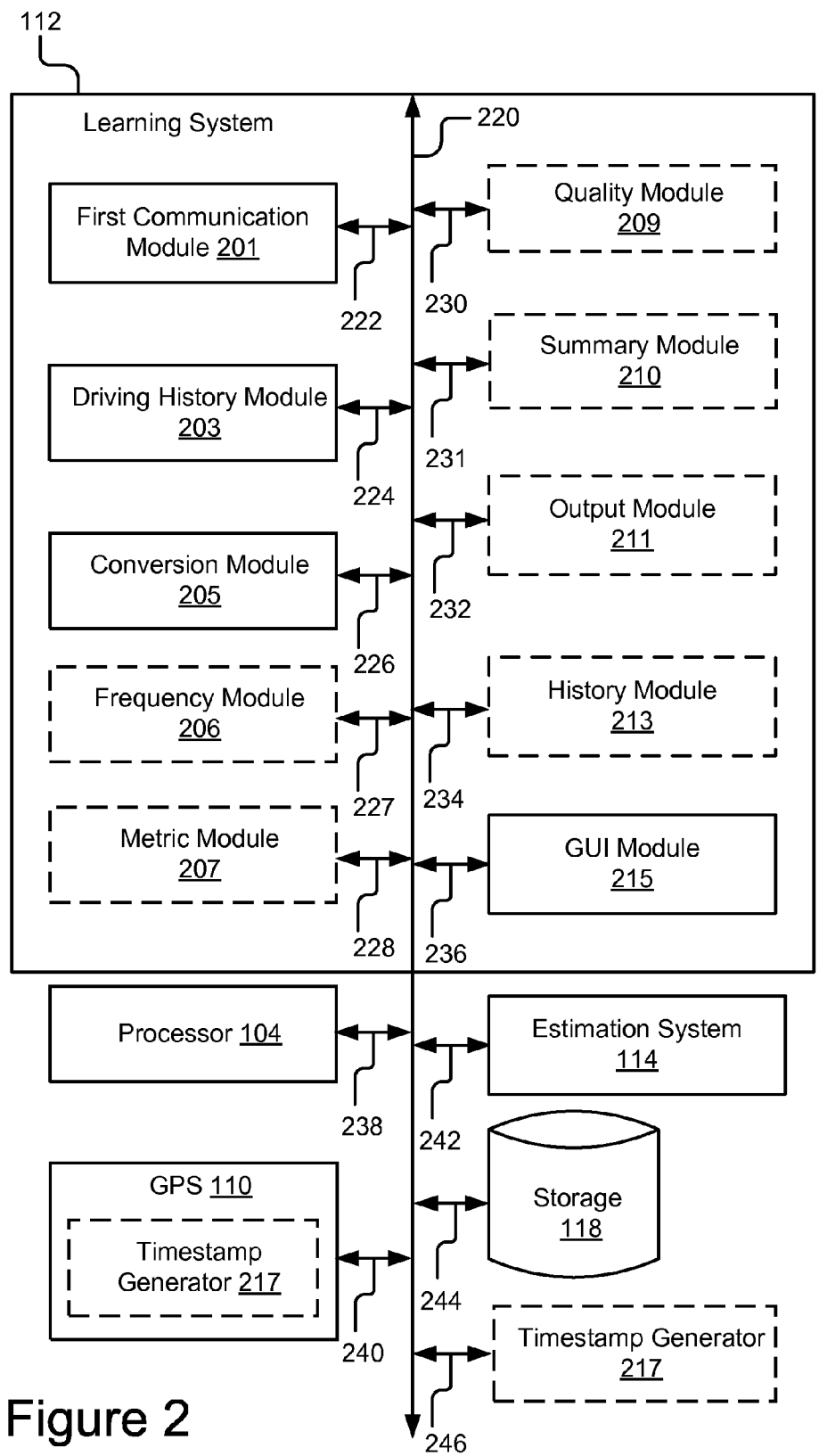
FIG. 2 is a block diagram illustrating a learning system according to one embodiment.
Figure 5:
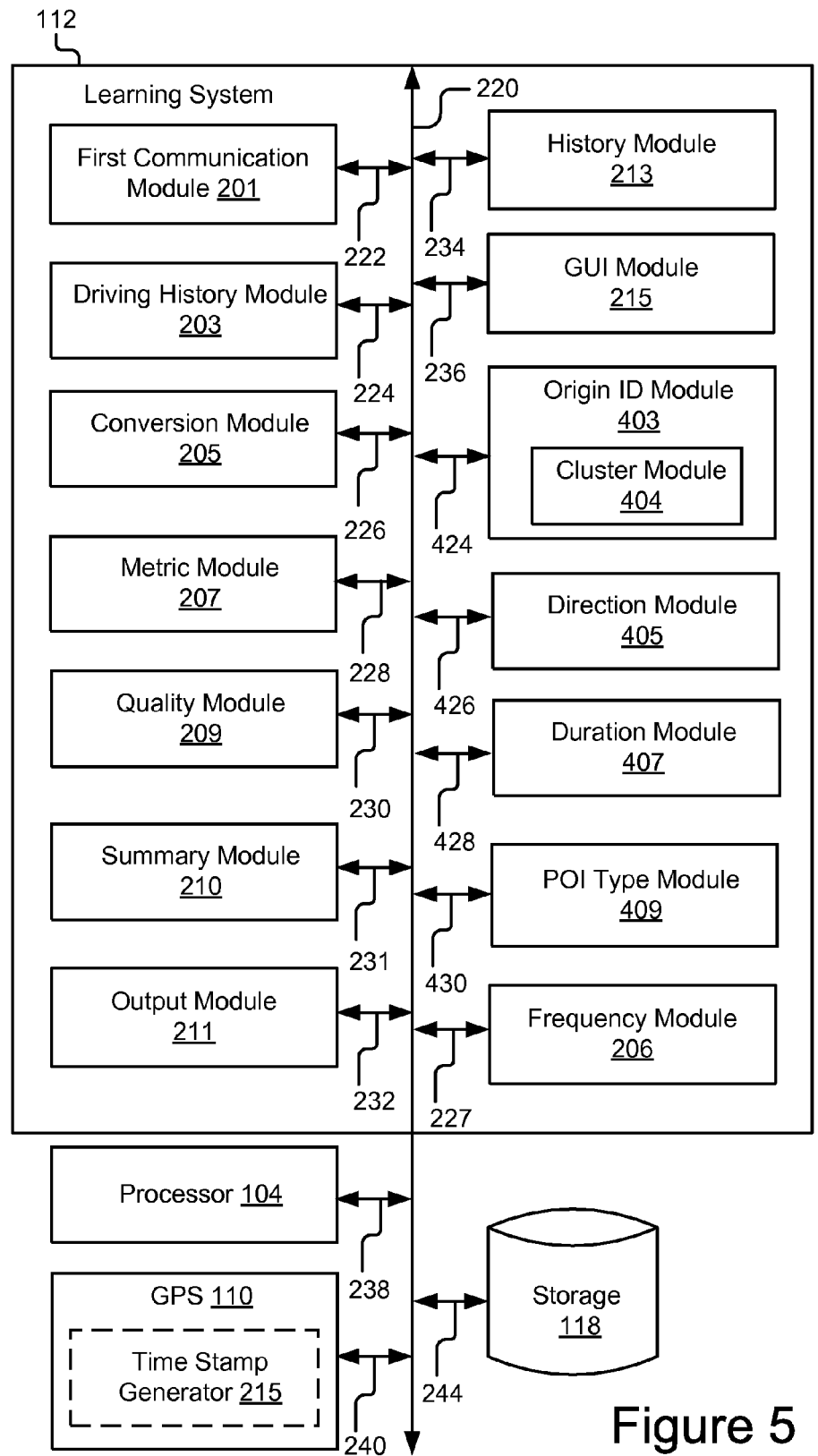
FIG. 5 is a block diagram illustrating a learning system according to another embodiment.

Referring now to FIGS. 2 and 5, the learning system 112 is shown in more detail. FIG. 2 is a block diagram illustrating a learning system 112 according to one embodiment. The learning system 112 communicates with other entities of the navigation system 102 via a bus 220. The processor 104 is communicatively coupled to the bus 220 via signal line 238. The estimation system 114 is communicatively coupled to the bus 220 via signal line 242. The storage 118 is communicatively coupled to the bus 220 via signal line 244. The GPS 110 is communicatively coupled to the bus 220 via signal line 240. In one embodiment, the GPS 110 includes a timestamp generator 217. The timestamp generator 217 is depicted using a dashed line to indicate that, in one embodiment, the timestamp generator 217 is directly coupled to the bus 220 via signal line 246.

The timestamp generator 217 is code and routines that, when executed by the processor 104, generates timestamp data describing the time. For example, the timestamp generator 217 generates a first timestamp describing the time, day and date of departure when a user driving a vehicle starts a new journey and a second timestamp describing the time, day and date of arrival when the user arrives at a destination. The timestamp generator 217 sends the timestamp data describing the time to one or more of the learning system 112, the estimation system 114 and the forgetting module 116.

The learning system 112 includes a first communication module 201, a driving history module 203, a conversion module 205 and a GUI module 215. Optionally, the learning system 112 further includes one or more of a frequency module 206, a metric module 207, a quality module 209, a summary module 210, an output module 211 and a history module 213. The components of the learning system 112 are communicatively coupled to each other via the bus 220. The frequency module 206, the metric module 207, the quality module 209, the summary module 210, the output module 211 and the history module 213 are depicted using dashed lines to indicate that in one embodiment these components with dashed lines are comprised within the estimation system 114.

The first communication module 201 is code and routines that, when executed by the processor 104, handles communications between components of the learning system 112 and other components of the system 100. For example, the first communication module 201 receives data from other components of the system 100 (e.g., the estimation system 114, the GPS 110, etc.) and sends the data to components of the learning system 112 (e.g., the driving history module 203, the conversion module 205, etc.). The first communication module 201 is communicatively coupled to the bus 220 via signal line 222. In one embodiment, the first communication module 201 also handles communications among the components of the learning system 112. For example, the first communication module 201 receives one or more metrics from the metric module 207 and sends the one or more metrics to the quality module 209. The metric is described below in more detail.

In one embodiment, the first communication module 201 retrieves data (e.g., driver history data, a set of learning parameters, etc.) from the storage 118 and sends the retrieved data to components of the learning system 112 (e.g., the driving history module 203, the frequency module 206, etc.). In another embodiment, the first communication module 201 receives data (e.g., a set of learning parameters) from components of the learning system 112 (e.g., the conversion module 205) and stores the data in the storage 118. One skilled in the art will recognize that the first communication module 201 may provide other functionality described herein.

The driving history module 203 is code and routines that, when executed by the processor 104, retrieves driver history data from the storage 118. For example, the driving history module 203 retrieves the driver history data from a driver history repository 316 and sends the driver history data to the conversion module 205. The driver history repository 316 is described below in more detail with reference to FIG. 3. The driving history module 203 is communicatively coupled to the bus 220 via signal line 224.

The conversion module 205 is code and routines that, when executed by the processor 104, converts driver history data to a set of learning parameters. For example, the conversion module 205 receives a set of driver history data from the driving history module 203 and converts the set of driver history data to a set of learning parameters as described below. The conversion module 205 is communicatively coupled to the bus 220 via signal line 226.

As described above, the driver history data includes data associated with one or more past journeys such as start points, departure data (e.g., time of departure, day of departure, week of departure and date of departure, etc.), direction data, duration data, end points, arrival data (e.g., time of arrival, day of arrival, week of arrival and date of arrival, etc.), POI data for the end points, etc. In one embodiment, the time of departure is also referred to as the time of day. The day of departure is referred to as the day of week. The week of departure is referred to as the week of year. The date of departure is referred to as the date of the year.

In one embodiment, the conversion module 205 converts the time of departure (e.g., 4:00:00 pm) for a journey (e.g., a past journey, a present journey or a potential journey, etc.) into one of a plurality of non-uniform segments. For example, the conversion module 205 converts the time of departure for a journey to one of: midnight; morning; lunch; afternoon; and night. An example of a table for converting the time of departure is shown in FIG. 18A.

Figures 18A, 18B, 18C:
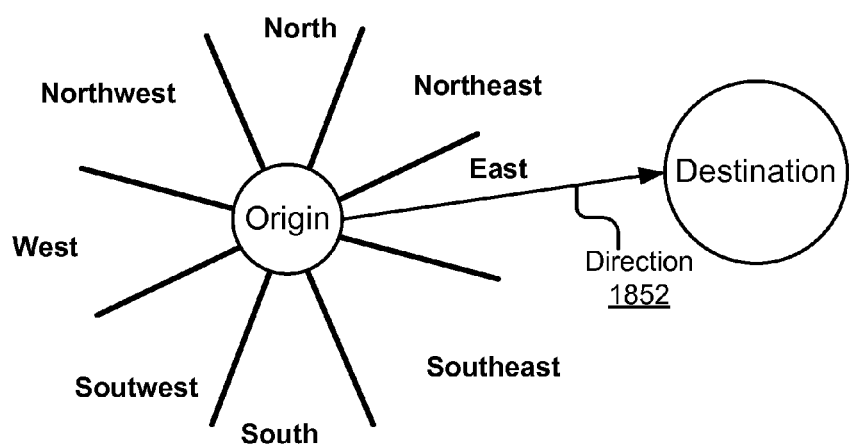
FIG. 18A is a graphical representation illustrating a table for converting a time of day for a journey according to one embodiment.
FIG. 18B is a graphical representation illustrating a table for converting a duration for a journey according to one embodiment.
FIG. 18C is a graphical representation illustrating a graph for converting a direction for a journey according to one embodiment.

Referring now to FIG. 18A, the conversion module 205 converts the time of departure to "midnight" if the time of departure for the journey is between midnight and 4:59:59 am. Alternatively, the conversion module 205 converts the time of departure to "morning" if the time of departure is between 5:00:00 am and 10:59:59 am. The conversion module 205 converts the time of departure to "lunch" if the time of departure is between 11:00:00 am and 1:59:59 pm. The conversion module 205 converts the time of departure to "afternoon" if the time of departure is between 2:00:00 pm and 7:59:59 pm. The conversion module 205 converts the time of departure to "night" if the time of departure is between 8:00:00 pm and 11:59:59 pm. Similarly, the conversion module 205 converts the time of arrival for a journey into one of a plurality of non-uniform segments. For example, the conversion module 205 converts the time of arrival to one of: midnight; morning; lunch; afternoon; and night.

The conversion module 205 converts the day of departure (e.g., Thursday) for a journey into one of a plurality of non-uniform segments. For example, the conversion module 205 converts the day of departure for the journey to one of: weekday; and weekend. For example, if the day of departure is from Monday to Friday, the conversion module 205 converts the day of departure to "weekday." If the day of departure is Saturday or Sunday, the conversion module 205 converts the day of departure to "weekend." Similarly, the conversion module 205 converts the day of arrival for a journey into one of a plurality of non-uniform segments. For example, the conversion module 205 converts the day of arrival to one of: weekday; and weekend.

The conversion module 205 converts a journey duration (e.g., 10 minutes) for a journey to one of a plurality of non-uniform segments. For example, the conversion module 205 converts the journey duration to one of: short; medium; and long. An example of a table for converting a journey duration is illustrated in FIG. 18B. In one embodiment, the journey duration is rounded up to an integrator. For example, if the journey duration is fourteen minutes and fifty seconds, the conversion module 205 rounds up the journey duration as fifteen minutes.

Referring now to FIG. 18B, the conversion module 205 converts the journey duration to "short" if the journey duration is between zero and fourteen minutes. The conversion module 205 converts the journey duration to "medium" if the journey duration is between fifteen minutes and twenty-nine minutes. The conversion module 205 converts the journey duration to "long" if the journey duration is not less than thirty minutes.

The conversion module 205 converts a direction of a journey to one of: east; southeast; south; southwest; west; northwest; north; and northeast. A graphical representation of an example to convert a direction is shown in FIG. 18C according to one embodiment. FIG. 18C is described below in more detail.

The conversion module 205 stores the converted data as a set of learning parameters in the storage 118. A learning parameter is any parameter associated with a journey. For example, a learning parameter is one of a start point, time of departure, date of departure, day of departure, week of year, a direction, a journey duration, an end location, a POI for the journey destination, time of arrival, date of arrival, day of arrival, etc., associated with a journey. In one embodiment, a learning parameter is one of a start point of a last journey (represented as "previous origin-1" in FIG. 17A) and a start point of a second last journey (represented as "previous origin-2" in FIG. 17A). A set of learning parameters includes any combination of a start point, time of departure, date of departure, day of week, week of year, a direction, a journey duration, an end location (or, a location for a journey destination), a POI for the journey destination, time of arrival, date of arrival, etc., associated with one or more journeys. In one embodiment, the set of learning parameters additionally includes a start point of a last journey and a start point of a second last journey.

In one embodiment, the set of learning parameters includes the driver history data without conversion. In another embodiment, the set of learning parameters includes the converted driver history data generated by the conversion module 205 as described above. In yet another embodiment, the set of learning parameters includes data included in the driver history data without conversion (e.g., date of departure, date of arrival, etc.) and converted data (e.g., converted day of week, converted time of day, etc.) generated by the conversion module 205 as described above. One skilled in the art will recognize that the set of learning parameters may include any other data for providing the functionality described herein.

The frequency module 206 is code and routines that, when executed by the processor 104, analyzes a set of learning parameters. For example, the frequency module 206 receives a set of learning parameters from the conversion module 205 and determines an occurring frequency for each destination based at least in part on the set of learning parameters. An occurring frequency for a learning parameter is a frequency that the learning parameter occurs. For example, an occurring frequency for a destination is a frequency that a user has visited the destination (e.g., a user has visited a gas station ten times). The frequency module 206 is communicatively coupled to the bus 220 via signal line 227.

In one embodiment, the frequency module 206 generates one or more learning tables and arranges the set of learning parameters in the one or more learning tables. For example, the frequency module 206 stores the set of learning parameters such as the destination data describing one or more destinations and describing entries for each destination (e.g., timestamp data describing a day of week and time of day for a journey to each destination, and direction data describing a direction to each destination, etc.) in a learning table. A learning table is table for storing a set of learning parameters. Data stored in a learning table is described below in more detail with reference to FIG. 3.

In another embodiment, the frequency module 206 analyzes the set of learning parameters and generates one or more metric tables for storing the analysis results. For example, the frequency module 206 counts an occurring frequency for each destination that the user has been to and stores the occurring frequency for each destination in a metric table. Examples of a metric table for storing the occurring frequencies are shown in FIGS. 19B and 19C. The metric table is described below in more detail.

In yet another embodiment, the frequency module 206 determines an occurring probability for each destination based at least in part on the occurring frequencies for all the destinations and generates a metric table to store the occurring probability. An occurring probability for a destination is a probability that a destination is visited. An example of a metric table for storing the occurring probabilities is shown in FIG. 19D.

In yet another embodiment, the frequency module 206 updates the one or more metric tables and/or learning tables based on a new set of learning parameters received from the conversion module 205.

A metric table is a table for storing one or more occurring frequencies and/or occurring probabilities for one or more learning parameters. For example, a metric table includes data describing that a user has been to a first destination (e.g., a gas station) five times and a second destination (e.g., a gym) twenty times. A metric table is one of a frequency table and a probability table. In one embodiment, a metric table lists one or more occurring frequencies for one or more destinations on a condition of one or more other learning parameters. For example, a metric table includes data describing that a user has visited a first destination (e.g., a gym) twenty times and a second destination (e.g., a restaurant) five times given that the time of day is "night." The metric table describing the occurring frequencies is referred to as a frequency table. In another embodiment, a metric table includes data describing the occurring probabilities for the destinations on a condition of one or more other learning parameters. Examples of a metric table describing the occurring probabilities are listed in FIG. 19A. A metric table that stores occurring probabilities is also referred to as a probability table. An example of a probability table is shown in FIG. 19D.

In one embodiment, the frequency module 206 selects two destinations with highest occurring frequencies from a metric table (e.g., a destination table "destTable" shown in FIG. 19A). The frequency module 206 labels the two destinations as "Home" and "Work," respectively. For example, the frequency module 206 assigns the destination with the highest occurring frequency as "Home" and the destination with the second highest occurring frequency as "Work." In one embodiment, the frequency module 206 recalculates the occurring frequency for each destination "Work," "Home" or any other destination. In another embodiment, the frequency module 206 determines one or more occurring probabilities (e.g., conditional probabilities, joint conditional probabilities, joint probabilities, etc.) for each destination "Work," "Home" or any other destination.

In one embodiment, the frequency module 206 analyzes the set of learning parameters to determine a candidate set of potential journeys. For example, the frequency module 206 extracts one or more frequent start locations (e.g., start locations for origins with highest occurring frequencies) and frequent end locations (e.g., end locations for destinations with highest occurring frequencies) based at least in part on one or more metric tables and determines the candidate set as journeys from the frequent start locations to the frequent end locations. The candidate set includes data describing frequent start locations and frequent end locations for one or more potential journeys to one or more destinations. In one embodiment, the candidate set includes three potential journeys.

In another embodiment, the frequency module 206 receives current journey data from an origin ID module 403. The origin ID module 403 is described below with reference to FIG. 4. The current journey data includes an origin identifier (ID) of a start point, an origin location (e.g., longitude and latitude) of the start point and a departure timestamp (e.g., time, day, date of departure) for a journey. One skilled in the art will recognize that the current journey data may include other data associated with a journey. In one embodiment, the frequency module stores the current journey data as additional driver history data in a driver history repository 316.

The frequency module 206 analyzes the set of learning parameters and the current journey data to generate estimated journey data describing one or more potential journeys. For example, the frequency module 206 extracts frequent end locations (e.g., end locations with highest occurring frequencies) matching to the current journey data such as an origin ID and an origin location from one or more metric tables. The frequency module 206 sets the frequent end locations as estimated destinations. The frequency module 206 determines the estimated journey data describing one or more potential journeys based at least in part on the current journey data and the estimated destinations. For example, the frequency module 206 determines the estimated journey data as data describing one or more potential journeys from the origin location included in the current journey data to the estimated destinations.

The estimated journey data is created corresponding to the estimated destinations. In one embodiment, the estimated journey data describes a candidate set of potential journeys. For example, the estimated journey data describes three potential journeys from the origin location included in the current journey data to three estimated destinations.

The metric module 207 is code and routines that, when executed by the processor 104, determines a metric for a potential journey. The metric module 207 is communicatively coupled to the bus 220 via signal line 228. A metric is data for characterizing a potential journey. For example, a metric for a potential journey is a probability that a user is likely to take the potential journey. In one embodiment, a metric for a potential journey is a joint conditional probability that a user is likely to take the potential journey given one or more variables such as time of day, day of week, origin ID, etc. The metric for a potential journey is described below in more detail.

In one embodiment, the metric module 207 receives one or more of: a set of journey duration data for one or more potential journeys from a duration module 407; direction data describing one or more directions for the one or more potential journeys from a direction module 405; and a POI type (e.g., home, work, gas station, restaurant, hotel, etc.) for each destination of each potential journey from a POI type module 409, etc. The duration module 407, the direction module 405 and the POI type module 409 are described below with reference to FIG. 4.

The metric module 207 determines a metric for each potential journey based at least in part on one or more variables associated with one or more potential journeys such as the journey duration data, the direction data, the POI type data, the time of day, the week of year, the day of week, an origin (e.g., a start point). In one embodiment, the metric module 207 determines the metric further based on one or more variables associated with one or more last journeys such as previous origins for the one or more last journeys, etc. For example, the metric module 207 determines the metric further based on a previous origin from a last journey.

Figure 17A:
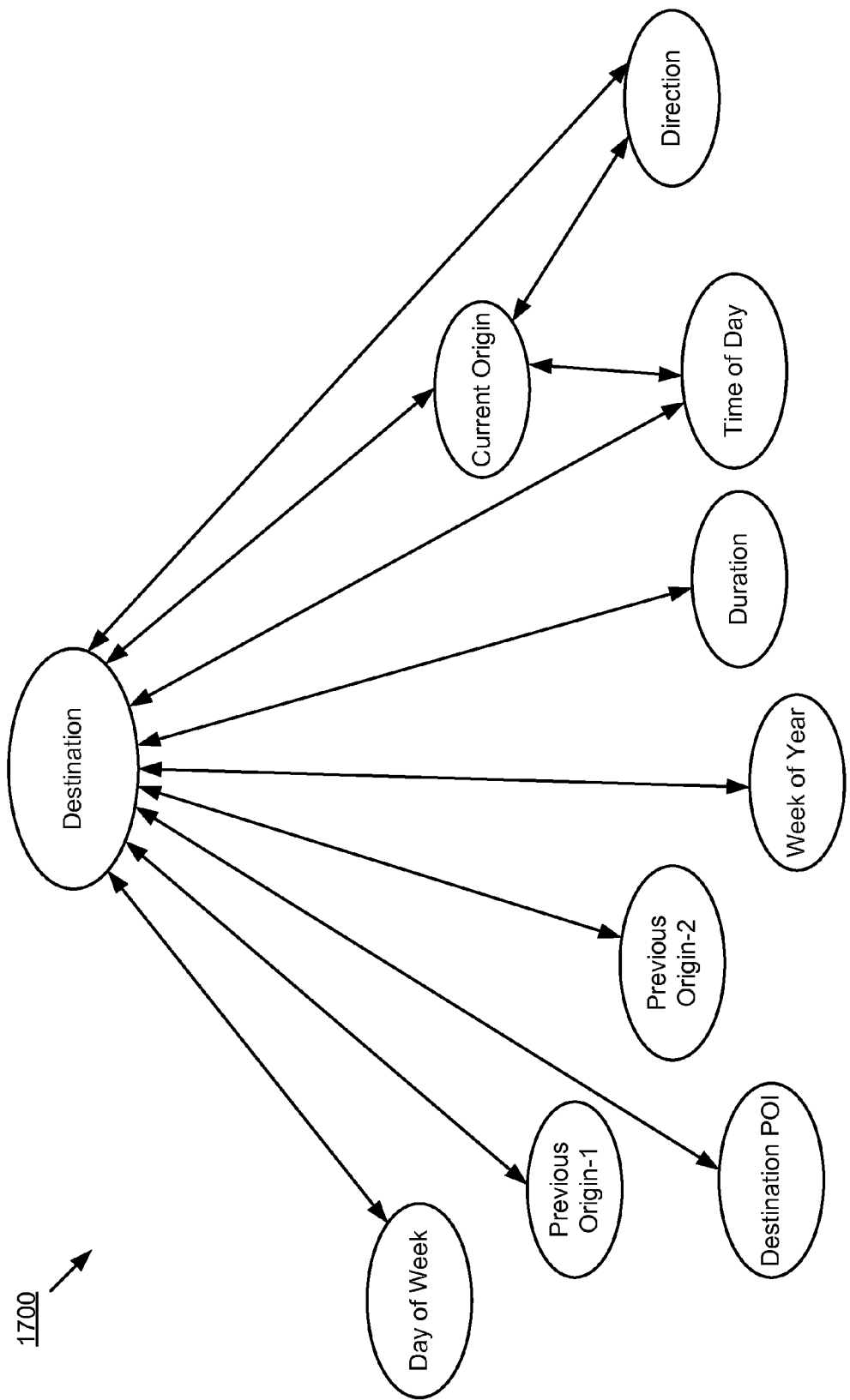
FIGS. 17A and 17B are graphical representations illustrating a metric estimation network according to various embodiments.
Figure 17B:
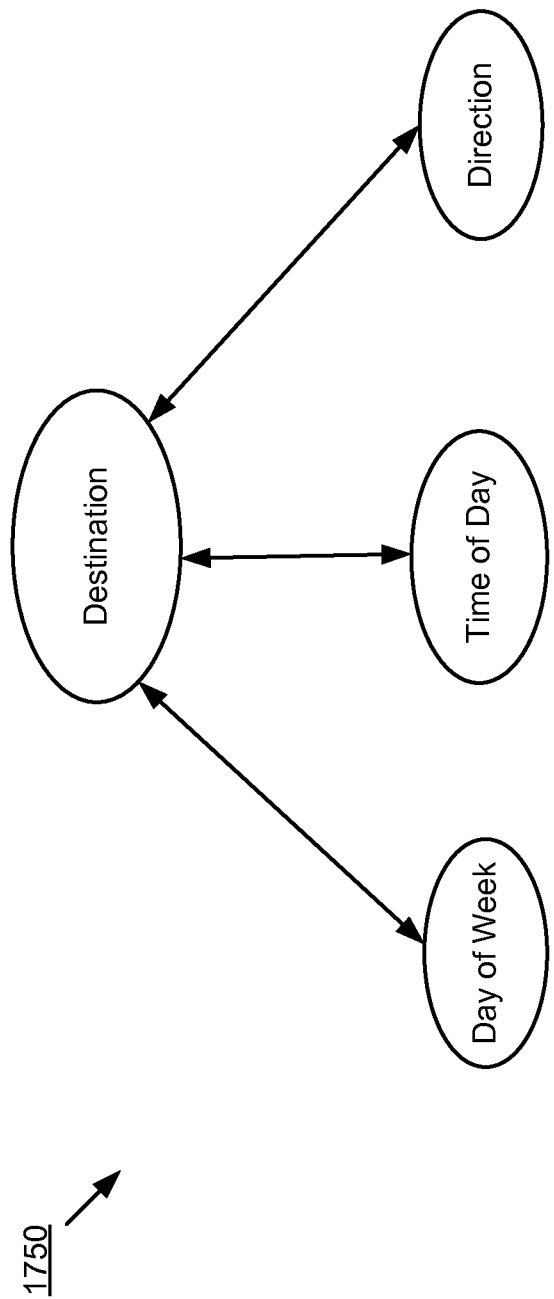

In one embodiment, the metric module 207 applies a metric estimation network to determine a metric for a potential journey. A metric estimation network is a network for estimating a metric. For example, a metric estimation network is a Bayesian network. In one embodiment, a metric estimation network indicates associations among the above-mentioned variables. Examples of a metric estimation network are shown in FIGS. 17A and 17B. In one embodiment, the associations included by a metric estimation network are described by the occurring probabilities (e.g., conditional probabilities, joint conditional probabilities, etc.) and/or occurring frequencies stored in a metric table. In one embodiment, the metric module 207 determines a metric for each potential journey as a joint conditional probability for a destination included in the potential journey given one or more of the above-mentioned variables.

For example, referring now to the metric estimation network shown in FIG. 17B, for a given destination, direction, time of day and day of week included in a potential journey, the metric module 207 retrieves: (1) a probability of the destination (represented as "p(D)") from a first metric table (e.g., a "destTable" listed in FIG. 19A); (2) a conditional probability of the destination given the direction (represented as "p(dir|D)") from a second metric table (e.g., a "dirTable" listed in FIG. 19A); (3) a conditional probability of the destination given the time of day (represented as "p(tod|D)") from a third metric table (e.g., a "todTable" listed in FIG. 19A); and (4) a conditional probability of the destination give the day of week (represented as "p(dow|D)") from a fourth metric table (e.g., a "dowTable" listed in FIG. 19A).

The metric module 207 calculates the metric for the potential journey to the destination as a joint conditional probability of the destination given the direction, time of day and day of week (represented as "p(dir, tod, dow|D)"). For example, the metric module 207 calculates the metric as the joint conditional probability "p(dir, tod, dow|D)" shown in the following:

$$p(\text{dir},\text{tod},\text{dow}|D) = p(D) \times p(\text{dir}|D) \times p(\text{tod}|D) \times p(\text{dow}|D).$$

The above mathematical expression is a minimal implementation for determining a metric for a potential journey. Although this minimal implementation is less accurate than implementations involving a complicated metric estimation network, it is space and time efficient because of the minimal number of variables involved in the calculation.

In other embodiments, the metric module 207 determines the metric using a complicated metric estimation network such as the network shown in FIG. 17A. For example, the metric module 207 calculates the metric for the potential journey to the destination based on probabilities, conditional probabilities and joint conditional probabilities involving all the variables shown in FIG. 17A. The probabilities, conditional probabilities and joint conditional probabilities involving all the variables are retrieved from the metric tables listed in FIG. 19A, respectively.

In one embodiment, the metric module 207 receives a set of current status data. The set of current status data includes one or more of the current journey data described above, a current location of a vehicle (e.g., a longitude and latitude of the current location), a current projected route for the present journey, a current road that the vehicle is on and the current time. In one embodiment, the metric module 207 receives the current journey data from the origin ID module 403 and the current location, the current projected route, the current road and the current time from the GPS 110.

The metric module 207 receives estimated journey data from the frequency module 206. The metric module 207 analyzes the estimated journey data and the set of current status data to determine one or more metrics associated with the estimated journey data. For example, the metric module 207 determines one or more metrics associated with one or more potential journeys described by the estimated journey data using a metric estimation network as described above.

In one embodiment, the metric module 207 sends the one or more metrics for the one or more potential journeys to the quality module 209. In another embodiment, the metric module 207 stores the one or more metrics in the storage 118.

In one embodiment, the metric module 207 determines whether any of the one or more metrics is related to an abnormal condition. Examples of an abnormal condition include that, but are not limited to: a probability for a destination exceeds one; a probability for a destination is below zero; all the metrics have a zero value; and all the metrics have an undetermined value, etc.

If an abnormal condition is detected, the metric module 207 determines a navigational recommendation related to the abnormal condition. For example, the metric module 207 determines to restart the navigation system 102 if an abnormal condition is detected. Examples of a navigational recommendation include, but are not limited to: ignoring the abnormal condition; eliminating the potential journey associated with the abnormal condition from the candidate set; requesting a user to input a destination; and resetting the navigation system 102, etc. The metric module 207 sends the navigational recommendation to the output module 211, causing the output module 211 to present the navigational recommendation to a user. In one embodiment, the user provides an input to the metric module 207, causing the metric module 207 to perform operations based on the input. For example, if the user provides an input to ignore the abnormal condition, the metric module 207 will neglect the abnormal condition.

The quality module 209 is code and routines that, when executed by the processor 104, determines one or more quality scores for one or more potential journeys. A quality score is data for evaluating a potential journey. A higher quality score for a potential journey indicates that a user is more likely to take the potential journey. In one embodiment, different quality scores are associated with different potential journeys. The quality module 209 is communicatively coupled to the bus 220 via signal line 230.

In one embodiment, the quality module 209 receives one or more metrics associated with one or more potential journeys from the metric module 207. The quality module 209 determines one or more quality scores for the one or more potential journeys based at least in part on the one or more metrics. For example, if a first metric associated with a first potential journey is greater than a second metric associated with a second potential journey, the quality module 209 generates a first quality score for the first potential journey that is greater than a second quality score for the second potential journey.

In one embodiment, the quality module 209 orders the one or more potential journeys based at least in part on the one or more associated quality scores. For example, the quality module 209 orders the one or more potential journeys so that a potential journey having a higher quality score is before a potential journey having a lower quality score.

The quality module 209 sends the one or more potential journeys and the associated quality scores to the output module 211, causing the output module 211 to present the one or more potential journeys and the quality scores to a user. For example, the quality module 209 sends three potential journeys having the highest quality scores to the output module 211, causing the output module 211 to present the three potential journeys and the associated quality scores via a display 160.

The summary module 210 is code and routines that, when executed by the processor 104, determines one or more of a status summary and an estimate summary of a journey. The summary module 210 is communicatively coupled to the bus 220 via signal line 231. In one embodiment, the summary module 210 receives data (e.g., location data, timestamp data, journey data for the present journey, etc.) from the GPS 110 and determines a status summary for a journey.

A status summary is data summarizing a current state of a journey. For example, the status summary includes one or more of a current location of a vehicle and elapsed journey time. In one embodiment, the elapsed journey time is shown on the display 160. In one embodiment, the status summary additionally includes the current status data (e.g., current journey data, a current location, a current projected route, current time, etc.) received from the origin ID module 403 and/or the GPS 110.

In one embodiment, the summary module 210 receives data from components of the learning system 112 and/or the estimation system 114. For example, the summary module 210 receives estimated journey data from the frequency module 206, one or more metrics from the metric module 207, one or more quality scores from the quality module 209 and one or more journey durations from the duration module 407 for one or more potential journeys. One skilled in the art will recognize that the summary module 210 may receive other data (e.g., search results) from other entities (e.g., a search server 124) of the system 100.

The summary module 210 determines an estimate summary for each potential journey based at least in part on one or more of the current journey data, the current status data and data received from components of the learning system 112 and/or the estimation system 114 (e.g., metrics, quality scores, etc.). An estimate summary is data summarizing an estimated state of a potential journey. For example, an estimate summary for a potential journey includes an estimated destination for the potential journey, an estimated route to the destination, an estimated time of arrival, a metric associated with the potential journey and a quality score associated with the potential journey, etc. One skilled in the art will recognize that the estimate summary may include any other data associated with the potential journey.

In one embodiment, the summary module 210 associates one or more status summaries and one or more estimate summaries with the estimated journey data. For example, the summary module 210 associates a status summary and an estimate summary for each potential journey with the estimated journey data describing the potential journey. The summary module 210 sends one or more of the estimated journey data, the status summaries and the estimate summaries to the output module 211.

The output module 211 is code and routines that, when executed by the processor 104, outputs data to one or more of a display 160, a learning system 112 and an estimation system 114. The output module 211 is communicatively coupled to the bus via signal line 232. In one embodiment, the output module 211 receives a navigational recommendation from the metric module 207 and outputs display data depicting the navigational recommendation to a user on the display 160. In another embodiment, the output module 211 receives one or more potential journeys and the associated quality scores from the quality module 209 and outputs the potential journeys and the quality scores to one or more of the learning system 112 and the display 160.

In one embodiment, the output module 211 receives estimated journey data, one or more status summaries and one or more estimate summaries from the summary module 210 and outputs display data for depicting the estimated journey data, the one or more status summaries and the one or more estimate summaries on the display 160. In another embodiment, the output module 211 receives graphical data for providing a GUI from the GUI module 215 and outputs the graphical data depicting the GUI on the display 160. One skilled in the art will recognize that the output module 211 may perform any other functionality described herein.

The history module 213 is code and routines that, when executed by the processor 104, logs data describing a present journey. For example, the history module 213 monitors for an end of the present journey. If the history module 213 detects the end of the present journey, the history module 213 collects data describing the present journey (e.g., time/day/date of arrival, time/day/date of departure, a start point, an end point, a journey duration, etc.) and stores the data in the driver history repository 316. The history module 213 is communicatively coupled to the bus 220 via signal line 234.

The GUI module 215 is code and routines that, when executed by the processor 104, generates graphical data for providing a GUI to a user. The GUI module 215 is communicatively coupled to the bus 220 via signal line 236. In one embodiment, the GUI module 215 generates graphical data for depicting a GUI to allow a user to interact with the system 100. For example, the GUI module 215 generates graphical data for depicting a GUI including a "share" button to allow a user to share a journey on a social network provided by the social network application 122. In another embodiment, the GUI module 215 receives one or more quality scores associated with one or more potential journeys from the quality module 209 and generates graphical data for providing a GUI to present the quality scores and the potential journeys to a user. One skilled in the art will recognize that the GUI module 215 may generate any other graphical data for providing the functionality described herein.

In one embodiment, the GUI module 215 sends the graphical data to the display 160, causing the display 160 to present the GUI to the user. In another embodiment, the GUI module 215 sends the graphical data to the output module 211, causing the output module 211 to present the data on the display 160.

Referring now to FIG. 5, a block diagram of the learning system 112 is illustrated according to another embodiment. In the illustrated embodiment, the learning system 112 includes a first communication module 201, a driving history module 203, a conversion module 205, a frequency module 206, a metric module 207, a quality module 209, a summary module 210, an output module 211, a history module 213, a GUI module 215, an origin ID module 403, a direction module 405, a duration module 407 and a POI type module 409. The origin ID module 403 includes a cluster module 404. The first communication module 201, the driving history module 203, the conversion module 205, the frequency module 206, the metric module 207, the quality module 209, the summary module 210, the output module 211, the history module 213 and the GUI module 215 are described above. The descriptions will not be repeated here. The origin ID module 403, the cluster module 404, the direction module 405, the duration module 407 and the POI type module 409 are described below with reference to FIG. 4.

Storage

Figure 3:
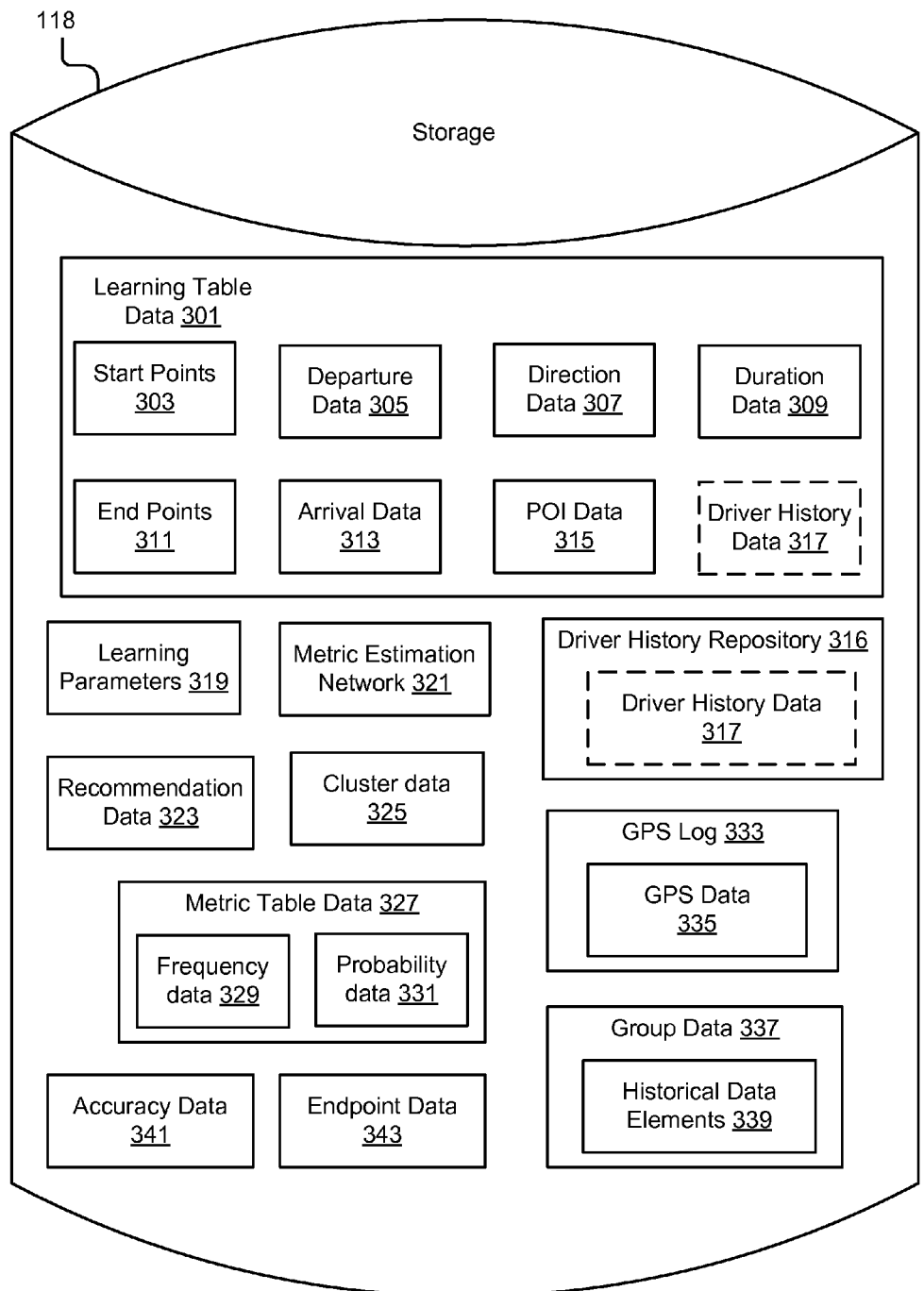
FIG. 3 is a block diagram illustrating a storage device according to one embodiment.

Referring now to FIG. 3, the storage 118 is shown in more detail. FIG. 3 is a block diagram illustrating a storage device 118 according to one embodiment. The storage 118 includes learning table data 301, driver history repository 316, learning parameters 319, metric estimation network 321, recommendation data 323, cluster data 325, metric table data 327, a GPS log 333, group data 337, accuracy data 341 and endpoint data 343. One skilled in the art will recognize that the storage 118 may store any other data for providing the functionality described herein.

The learning table data 301 is data for constructing one or more learning tables. In one embodiment, the learning table data 301 is data describing one or more learning parameters arranged in one or more learning tables. In the illustrated embodiment, the learning table data 301 includes start points 303, departure data 305, direction data 307, duration data 309, end points 311, arrival data 313 and POI data 315. Optionally, the learning table data 301 includes driver history data 317. One skilled in the art will recognize that the learning table data 301 may include any other data for providing the functionality described herein.

The start points 303 include location data describing one or more start points for one or more journeys. For example, the start points 303 include data describing longitudes and latitudes for one or more start points of one or more journeys. In one embodiment, the start points 303 include data describing one or more origin IDs for one or more start locations.

The departure data 305 is data describing a departure in a journey. For example, the departure data 305 includes timestamp data describing one or more of time of departure (e.g., 2:00:00 pm), day of departure (e.g., Monday), date of departure (e.g., Nov. 21, 2011) and week of year. In one embodiment, the departure data 305 includes converted data describing one or more of time of departure (e.g., midnight, morning, lunch, afternoon or night) and day of departure (e.g., weekday or weekend).

The direction data 307 is data describing a direction for a journey. For example, the direction data 307 includes data describing that a direction for a journey is one of south, southeast, east, northeast, north, northwest, west and southwest.

The duration data 309 is data describing a duration for a journey. For example, the duration data 309 includes data describing that a user spent ten minutes on a past journey. In one embodiment, the duration data 309 includes converted data describing a duration for a journey (e.g., short, medium and long, etc.).

The end points 311 include location data describing one or more end points for one or more journeys. For example, the end points 311 include data describing longitudes and latitudes for one or more end points of one or more journeys. In one embodiment, the end points 311 include data describing one or more destination IDs for one or more end points.

The arrival data 313 is data describing arriving at a destination in a journey. For example, the arrival data 313 includes timestamp data describing one or more of time of arrival (e.g., 3:00:00 pm), day of arrival (e.g., Monday), date of arrival (e.g., Nov. 21, 2011) and week of year at arrival. In one embodiment, the arrival data 313 includes converted data describing one or more of time of arrival (e.g., midnight, morning, lunch, afternoon or night) and day of arrival (e.g., weekday or weekend).

The POI data 315 is data describing a point of interest for a destination. For example, the POI data 315 describes that a destination is one of "Home," "Work" and "Other." In one embodiment, an "other" destination includes one of all the other destinations such as "Gas Station," "Coffee Shops," "Restaurants," etc., except the "Home" and "Work" destinations.

The driver history data 317 is data describing a driving history of a user (e.g., a driver). For example, the driver history data 317 includes data describing one or more past journeys that a driver has taken. In one embodiment, the driver history data 317 includes non-converted data (e.g., data before conversion performed by the conversion module 205) describing one or more past journeys such as one or more of start points, departure data (e.g., departure time and date, etc.), direction data, duration data, end points, arrival data (e.g., arrival time and date, etc.), POI data for the end points, etc. The driver history data 317 is depicted using a dashed line to indicate that while in one embodiment the driver history data 317 is stored in the learning table data 301, in another embodiment the driver history data 317 is stored in the driver history repository 316.

The driver history repository 316 is a container for storing data. For example, the driver history repository 316 is a container for storing the driver history data 317.

The learning parameters 319 include data describing a set of learning parameters from one or more journeys. In one embodiment, the learning parameters 319 include converted driver history data from the conversion module 205. In another embodiment, the learning parameters 319 include non-converted driver history data. One skilled in the art will recognize that the learning parameters 319 may include any other data associated with the learning parameters.

The metric estimation network 321 includes data for establishing one or more metric estimation networks. For example, the metric estimation network 321 includes data describing one or more variables included in a metric estimation network and one or more associations between the variables.

The recommendation data 323 is data describing one or more navigational recommendations. For example, the recommendation data 323 includes data describing one or more navigational recommendations and the abnormal conditions associated with the one or more navigational recommendations.

The cluster data 325 is data describing one or more clusters. In one embodiment, the cluster data 325 includes data describing a list of existing clusters. A cluster includes data describing a group of locations (e.g., start locations or end locations) within a clustering range of a cluster center. A cluster is described by a cluster ID, a clustering range and a cluster center. The cluster, the clustering range and the cluster center are described below with reference to FIG. 4.

The metric table data 327 is data for constructing one or more metric tables. For example, the metric table data 327 includes data stored in one or more metric tables. In one embodiment, the metric table data 327 includes frequency data 329 and probability data 331.

The frequency data 329 is data describing one or more occurring frequencies for one or more learning parameters. For example, the frequency data 329 includes data describing one or more occurring frequencies for one or more destinations. In one embodiment, the frequency data 329 includes data describing one or more occurring frequencies for one or more destinations on a condition of one or more other learning parameters. For example, the frequency data 329 includes data describing one or more occurring frequencies for one or more destinations at a given time of day.

The probability data 331 is data describing one or more occurring probabilities for one or more learning parameters. For example, the probability data 331 includes data describing one or more occurring probabilities for one or more destinations. In one embodiment, the probability data 331 includes data describing one or more occurring probabilities for one or more destinations on a condition of one or more other learning parameters. For example, the probability data 331 includes data describing one or more occurring probabilities for one or more destinations at a given time of day.

The GPS log 333 is a log storing data generated by the GPS 110. For example, the GPS log 333 stores GPS data 335. The GPS data 335 is data generated by the GPS 110. In one embodiment, the GPS data 335 includes a stream of data generated by the GPS 110. The stream of data includes one or more data elements with each data element including a geographic position describing a location of a traveling vehicle and a timestamp describing the time when the traveling vehicle is at the geographic position.

The group data 337 is data describing one or more groups of historical data elements. For example, the group data 337 is data describing a group that includes one or more historical data elements 339. A historical data element is a data element obtained from a past journey. For example, a historical data element includes a past geographic position (e.g., a geographic position from a past journey) for a traveling vehicle and a past timestamp when the traveling vehicle was at the past geographic position in a past journey. The group data 337 is described below in more detail with reference to FIG. 7.

The accuracy data 341 is data describing a known accuracy of the GPS 110. For example, the accuracy data 341 describes that the accuracy of the GPS 110 is within a deviation of 10 meters on average. The accuracy data 341 is described below in more detail with reference to FIG. 7.

The endpoint data 343 is data describing one or more journey destination endpoints. In one embodiment, the endpoint data 343 includes data describing journey destination endpoints with each journey destination endpoint associated with an endpoint score greater than a score threshold. The journey destination endpoint, the endpoint score and the score threshold are described below with reference to FIG. 7.

Estimation System

Figure 4:
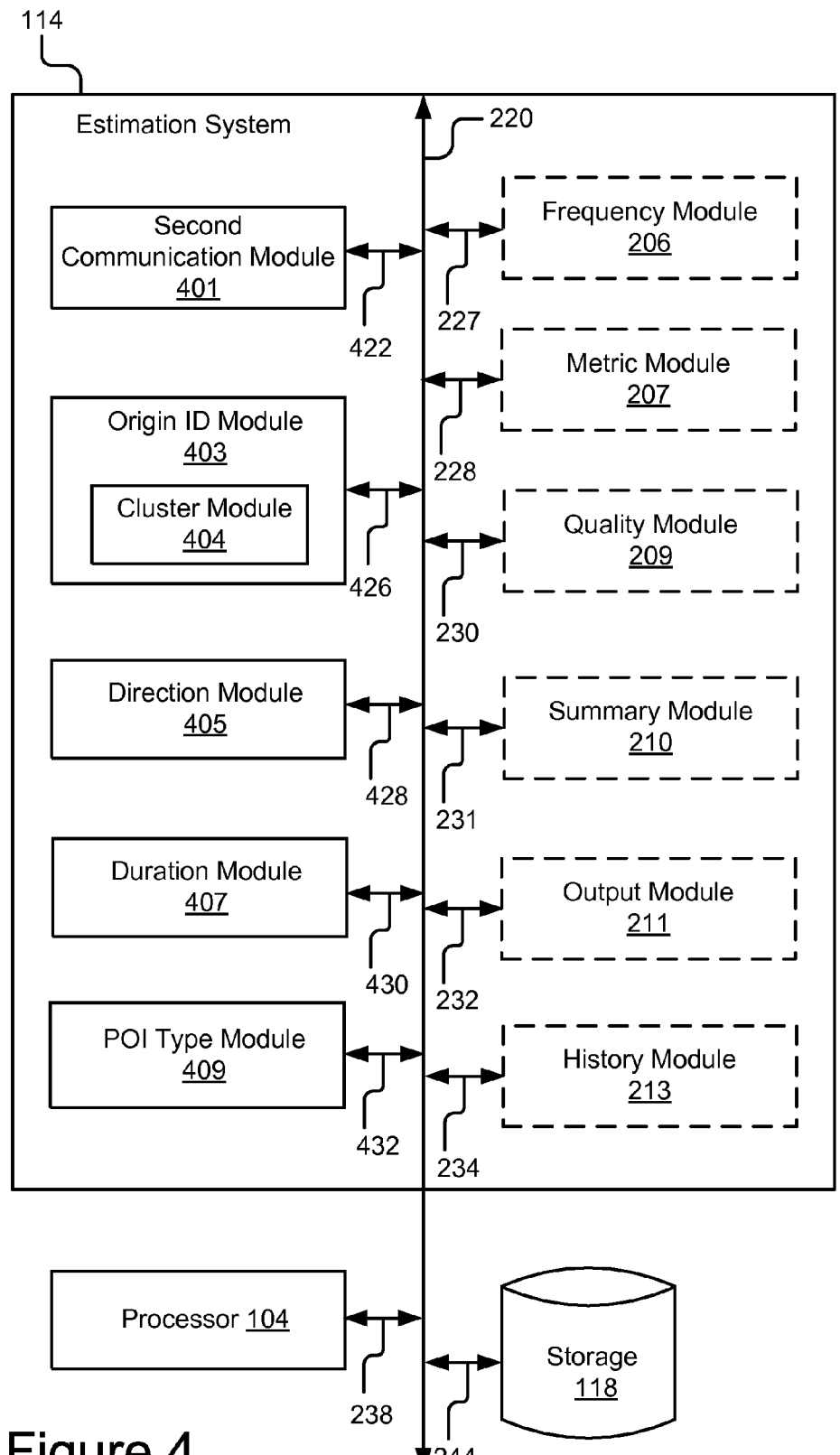
FIG. 4 is a block diagram illustrating an estimation system according to one embodiment.

FIG. 4 is a block diagram illustrating an estimation system 114 according to one embodiment. The estimation system 114 includes a second communication module 401, an origin ID module 403, a direction module 405, a duration module 407 and a POI type module 409. Optionally, the estimation system 114 includes the frequency module 206, the metric module 207, the quality module 209, the summary module 210, the output module 211 and the history module 213. The estimation system 114 communicates with the processor 104 and/or the storage 118 via the bus 220.

The second communication module 401 is code and routines for handling communications between components of the estimation system 114 and other components of the system 100. For example, the second communication module 401 receives data from other components of the system 100 (e.g., the learning system 112, the GPS 110, etc.) and sends the data to components of the estimation system 114 (e.g., the origin ID module 403, etc.). The second communication module 401 is communicatively coupled to the bus 220 via signal line 422. In one embodiment, the second communication module 401 also handles communications among the components of the estimation system 114. For example, the second communication module 401 receives one or more metrics from the metric module 207 and sends the one or more metrics to the quality module 209.

In one embodiment, the second communication module 401 receives data (e.g., location data, timestamp data, etc.) from the GPS 110 and sends the data to components of the estimation system 114 (e.g., the origin ID module 403, the direction module 405, etc.). One skilled in the art will recognize that the second communication module 401 may provide other functionality described herein.

The origin ID module 403 is code and routines that, when executed by the processor 104, determines current journey data for a journey. The origin ID module 403 is communicatively coupled to the bus 220 via signal line 424. In one embodiment, the origin ID module 403 receives location data describing a start point of a journey and timestamp data describing a departure timestamp including one or more of time of departure, day of departure and date of departure from the GPS 110. The origin ID module 403 determines current journey data including one or more of an origin ID, a departure location and a departure timestamp for the journey. The origin ID for the start point is described below in more detail. The origin ID module 403 sends the current journey data to one or more of the frequency module 206 and the summary module 210. In one embodiment, the origin ID module 403 stores the current journey data in the storage 118.

The origin ID module 403 includes a cluster module 404. The cluster module 404 is code and routines that, when executed by the processor 104, arranges a location in a cluster. In one embodiment, the cluster module 404 arranges a departure location (e.g., a start point of a journey) in a cluster as described below. The cluster module 404 determines a clustering range for a cluster. A clustering range is a distance (e.g., 200 meters) from a cluster center within which all the locations are assigned to a cluster associated with the cluster center. A cluster center is a center of a cluster.

The cluster module 404 retrieves cluster data describing a list of existing clusters from the storage 118. The cluster module 404 determines whether the list is empty. If the list is empty, the cluster module 404 generates a new cluster and adds the new cluster to the list. The cluster module 404 creates a cluster ID for the new cluster and assigns the departure location to the new cluster. For example, the cluster module 404 assigns the cluster ID as an origin ID for the departure location.

Alternatively, if the list is not empty, the cluster module 404 compares the departure location to each cluster included in the list and determines whether the departure location is within the clustering range of any cluster. If the departure location is not within the clustering range of any cluster, the cluster module 404 generates a new cluster and assigns a cluster ID to the new cluster. The cluster module 404 adds the departure location to the new cluster and assigns the cluster ID as an origin ID for the departure location. If the departure location is within the clustering range of an existing cluster, the cluster module 404 adds the departure location to the existing cluster and assigns the cluster ID of the existing cluster as an origin ID for the departure location.

In one embodiment, the cluster module 404 updates the cluster center for the cluster after adding the departure location to the cluster. For example, the cluster module 404 recalculates the cluster center for the cluster based at least in part on all the locations included in the cluster. The cluster module 404 updates the list of clusters and stores the updated list in the storage 118. In one embodiment, the cluster module 404 arranges an arrival location (e.g., an end point) of a journey in a cluster and assigns a cluster ID as a destination ID for the arrival location by performing operations similar to those described above for arranging a departure location in a cluster.

The direction module 405 is code and routines that, when executed by the processor 104, determines a direction for a journey. The direction module 405 is communicatively coupled to the bus 220 via signal line 426. For example, the direction module 405 receives a current time of day from the timestamp generator 217 of the GPS 110 and the current journey data from the origin ID module 403. The direction module 405 estimates a direction for a journey based at least in part on one or more of the current time of day and the current journey data. In one embodiment, the direction module 405 retrieves driver history data from the storage 118 and estimates the direction for the journey further based on the driver history data. In another embodiment, the direction module 405 estimates the direction for the journey further based on one or more metric tables associated with one or more directions.

In one embodiment, the direction module 405 sends direction data describing the direction to the metric module 207. In another embodiment, the direction module 405 sends the direction data to the conversion module 205. The conversion module 205 converts the direction data as described above and sends the converted direction data to the metric module 207.

The duration module 407 is code and routines that, when executed by the processor 104, estimates a duration for a journey. The duration module 407 is communicatively coupled to the bus 220 via signal line 428. In one embodiment, the duration module 407 receives timestamp data describing a current time of day from the timestamp generator 217 and the current journey data from the origin ID module 403. The duration module 407 estimates a duration for a journey based at least in part on one or more of the current time of day and the current journey data. In one embodiment, the duration module 407 retrieves driver history data from the storage 118 and estimates the duration for the journey further based on the driver history data. In another embodiment, the duration module 407 estimates the duration for the journey further based on one or more metric tables associated with one or more durations.

In one embodiment, the duration module 407 sends journey duration data describing the duration of a journey to the metric module 207. In another embodiment, the duration module 407 sends the journey duration data to the conversion module 205. The conversion module 205 converts the journey duration data into non-uniform segments and sends the converted journey duration data to the metric module 207.

The POI type module 409 is code and routines that, when executed by the processor 104, determines a POI type for a destination of a journey. The POI type module 409 is communicatively coupled to the bus 220 via signal line 430. In one embodiment, the POI type module 409 receives timestamp data describing a current time of day from the timestamp generator 217 and the current journey data from the origin ID module 403. The POI type module 409 estimates a POI type for a journey based at least in part on one or more of the current time of day and the current journey data. In one embodiment, the POI type module 409 retrieves driver history data from the storage 118 and estimates the POI type for the journey further based on the driver history data. In another embodiment, the POI type module 409 estimates the POI type for the journey further based on one or more metric tables associated with POI types for destinations. In one embodiment, the POI type module 409 sends data describing the estimated POI type for the destination to the metric module 207.

Forgetting Module

Figure 6:
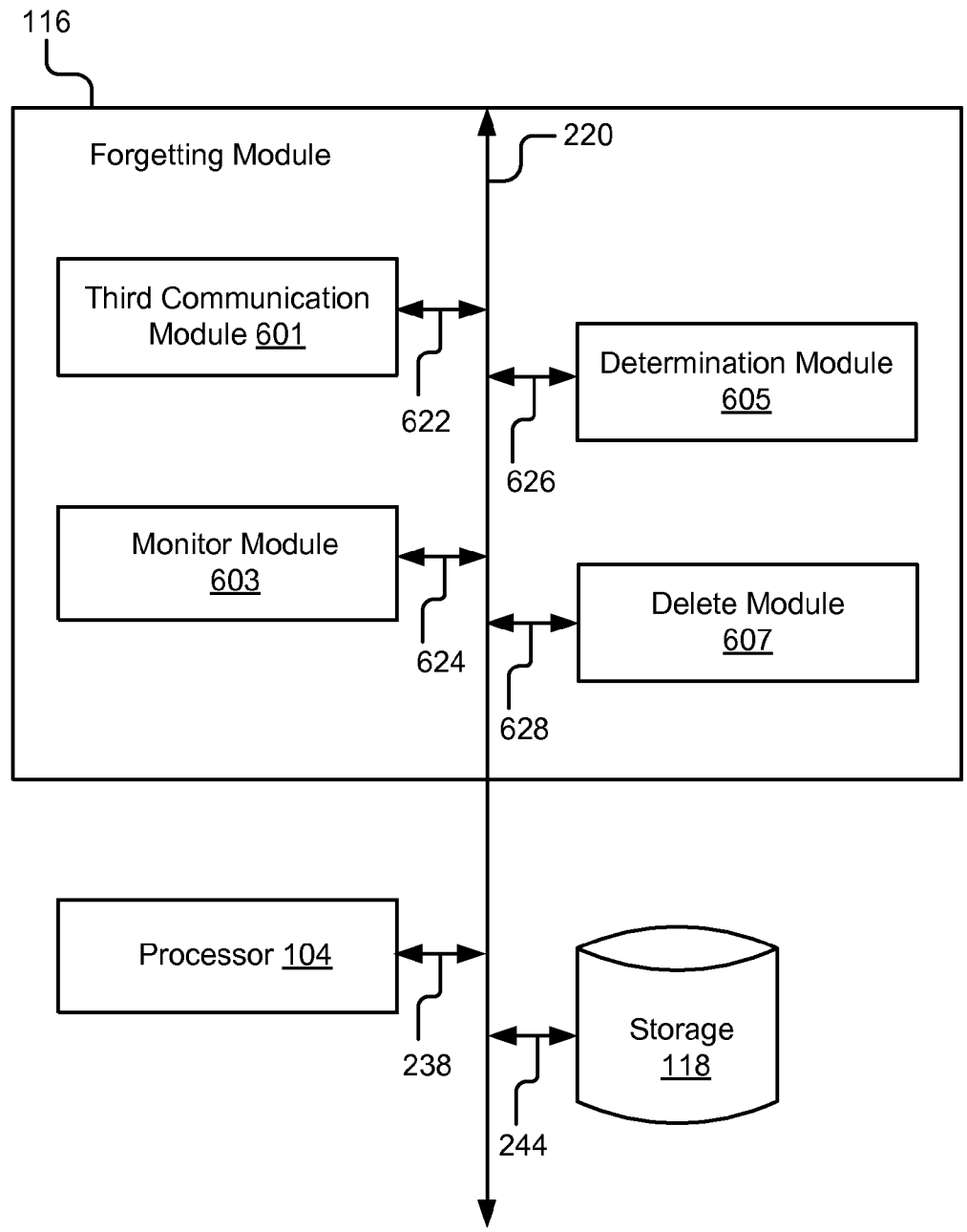
FIG. 6 is a block diagram illustrating a forgetting module according to one embodiment.

FIG. 6 is a block diagram illustrating a forgetting module 116 according to one embodiment. The forgetting module 116 includes a third communication module 601, a monitor module 603, a determination module 605 and a delete module 607. These components of the forgetting module 116 are communicatively coupled to each other via the bus 220. The forgetting module 116 is communicatively coupled to the processor 104, the storage 118 and other components of the navigation system 102 via the bus 220.

The third communication module 601 is code and routines for handling communications between components of the forgetting module 116 and other components of the system 100. For example, the third communication module 601 receives data from other components of the system 100 (e.g., the learning system 112, the GPS 110, etc.) and sends the data to components of the forgetting module 116 (e.g., the monitor module 603, the determination module 605, etc.). The third communication module 601 is communicatively coupled to the bus 220 via signal line 622. In one embodiment, the third communication module 601 also handles communications among the components of the forgetting module 116. For example, the third communication module 601 receives one or more trigger events from the monitor module 603 and sends the one or more trigger events to the determination module 605.

In one embodiment, the third communication module 601 retrieves data (e.g., learning parameters, driver history data, etc.) from the storage 118 and sends the data to components of the forgetting module 116 (e.g., the delete module 607). One skilled in the art will recognize that the third communication module 601 may provide other functionality described herein.

The monitor module 603 is code and routines that, when executed by the processor 104, detects a trigger event. In one embodiment, the monitor module 603 monitors the navigation system 102 for any trigger event. The monitor module 603 detects a trigger event when the trigger event occurs. The monitor module 603 sends event data describing the trigger event to the determination module 605. The monitor module 603 is communicatively coupled to the bus 220 via signal line 624.

A trigger event is an event triggering data deletion in a memory. For example, a trigger event is one of a factory reset input, a user request to delete one or more stored destinations, a lapse of a predetermined period of time since a last trigger event, a number of destinations stored in the memory that exceed a predetermined threshold and a predetermined number of journeys that have occurred since a last trigger event.

The determination module 605 is code and routines that, when executed by the processor 104, determines data to delete from a memory. For example, the determination module 605 determines a set of learning parameters to delete from a memory (e.g., the storage 118) based at least in part on the detection of a trigger event and a classification of the trigger event as described below. The determination module 605 is communicatively coupled to the bus 220 via signal line 626.

In one embodiment, the data to delete from a memory is data associated with one or more destinations. For example, the data to delete is a set of learning parameters associated with one or more destinations that includes: destination data describing one or more destinations stored in one or more learning tables; and describing entries for the one or more destinations in the learning tables. The describing entries include, for example, timestamp data describing a day of week, time of day and date of year for a journey to a destination, journey duration data describing a duration for the journey and direction data describing a direction to the destination, etc. In another embodiment, the data to delete includes a set of learning parameters and driver history data associated with one or more journeys to the one or more destinations, and data stored in one or more metric tables associated with the one or more destinations. In yet another embodiment, the data to delete is all the data associated with all the destinations if the trigger event is a factory reset input.

In one embodiment, the determination module 605 receives event data describing a trigger event from the monitor module 603 and determines a classification for the trigger event. For example, the determination module 605 determines whether the trigger event is a factory reset input or other trigger event. If the trigger event is a factory reset input, the determination module 605 generates a reset signal and sends the reset signal to the delete module 607.

If the trigger event is not a factory reset input, the determination module 605 interrogates the memory associated with the navigation system 102 to determine whether the available memory in the navigation system 102 is below a threshold. For example, the determination module 605 determines whether the available storage space in the storage 118 is below a threshold. In one embodiment, the threshold is set by an administrator of the navigation system 102. If the available memory is not below the threshold, the determination module 605 determines not to delete any data from the memory and sends a canceling signal to the delete module 607. If the available memory is below the threshold, the determination module 605 selects one or more destinations as described below so that data associated with the one or more selected destinations is deleted by the delete module 607. In one embodiment, the determination module 605 determines to delete data associated with one or more destinations no matter whether the available memory is below the threshold or not. The determination module 605 sends one or more identifiers of the selected destinations to the delete module 607 for data deletion.

In one embodiment, the determination module 605 orders all the destinations that a user has visited according to a timestamp for a last visit to each destination. For example, the determination module 605 orders all the destinations in a first queue so that a first destination having an older timestamp is before a second destination having a more recent timestamp. Next, the determination module 605 orders all the destinations according to the occurring frequency for each destination. For example, the determination module 605 orders all the destinations in a second queue so that a first destination having a lower occurring frequency is before a second destination having a higher occurring frequency.

The determination module 605 determines a set of pending destinations based at least in part on the ordering of the destinations. For example, the determination module 605 selects a first set of destinations with the oldest timestamps from the first queue (e.g., 20 destinations with oldest timestamps for a last visit) and a second set of destinations with the lowest occurring frequencies from the second queue (e.g., 20 destinations with least visits). The determination module 605 determines the set of pending destinations as one or more destinations that are included in both the first set of destinations and the second set of destinations.

In one embodiment, the determination module 605 randomly selects one or more destinations from the set of pending destinations and determines to delete data associated with the one or more selected destinations. The determination module 605 sends one or more identifiers of the selected destinations to the delete module 607 for data deletion.

The delete module 607 is code and routines that, when executed by the processor 104, deletes data from a memory. The delete module 607 is communicatively coupled to the bus 220 via signal line 628. In one embodiment, the delete module 607 receives a reset signal from the determination module 605 and resets the navigation system 102. For example, the delete module 607 deletes all the learning parameters, the learning table data, the metric table data and driver history data, etc., from the storage 118 responsive to receiving the reset signal. In another embodiment, the delete module 607 receives a canceling signal from the determination module 605 and does not delete any data responsive to the canceling signal.

In one embodiment, the delete module 607 receives one or more identifiers of the one or more selected destinations and deletes data associated with the one or more selected destinations (e.g., learning parameters, driver history data, learning table data, metric table data, etc., associated with the one or more selected destinations).

It is beneficial to delete data associated with one or more obsolete destinations since, for example, it deletes obsolete data and saves storage space for other usages. This is particularly advantageous when the navigation system 102 has limited storage space. Furthermore, the deletion of the obsolete data reduces the influence of data associated with old and least visited destinations on the estimations of the metrics and quality scores, and therefore improves the accuracy of the estimation for potential journeys.

Endpoint Module

Figure 7:
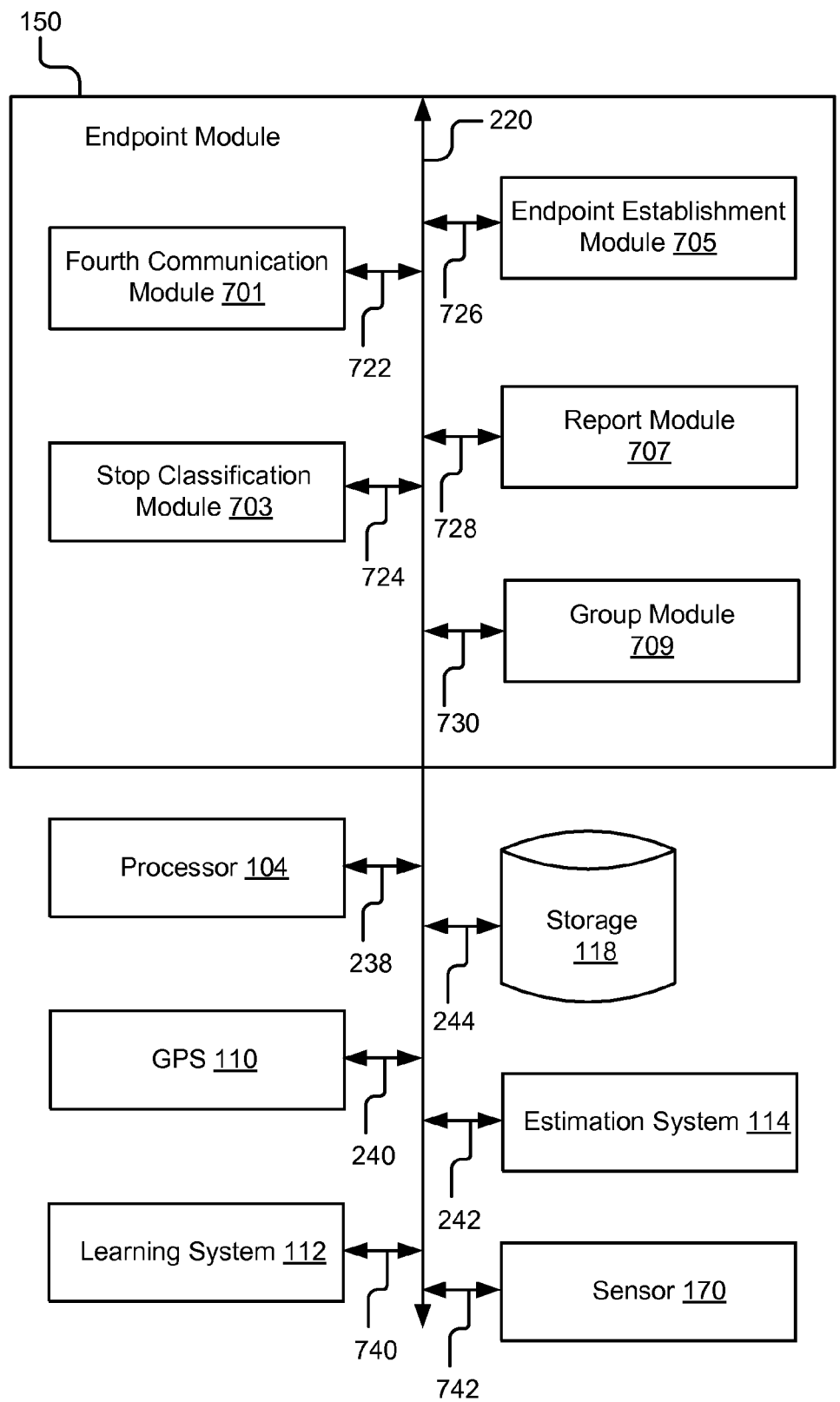
FIG. 7 is a block diagram illustrating an endpoint module according to one embodiment.

Referring now to FIG. 7, the endpoint module 150 is shown in more detail. FIG. 7 is a block diagram illustrating an endpoint module 150 according to one embodiment. The endpoint module 150 is communicatively coupled to the processor 104, the GPS 110, the learning system 112, the storage 118, the estimation system 114, the sensor 170 and other components of the navigation system 102 via the bus 220. The learning system 112 is communicatively coupled to the bus 220 via signal line 740. The sensor 170 is communicatively coupled to the bus 220 via signal line 742. The endpoint module 150 includes a fourth communication module 701, a stop classification module 703, an endpoint establishment module 705, a report module 707 and a group module 709.

The fourth communication module 701 is code and routines that, when executed by the processor 104, handles communications between components of the endpoint module 150 and other components of the system 100. For example, the fourth communication module 701 receives data (e.g., a stream of data) from other components of the system 100 (e.g., the GPS 110, etc.) and sends the data to components of the endpoint module 150 (e.g., the stop classification module 703, etc.). The fourth communication module 701 is communicatively coupled to the bus 220 via signal line 722.

In one embodiment, the fourth communication module 701 also handles communications among the components of the endpoint module 150. For example, the fourth communication module 701 receives a type of a stop (a long stop, an intermediate stop, etc.) for a traveling vehicle from the stop classification module 703 and sends the type of the stop to the endpoint establishment module 705. The type of the stop is described below in more detail.

In one embodiment, the fourth communication module 701 retrieves data (e.g., accuracy data 341, group data 337, etc.) from the storage 118 and sends the retrieved data to components of the endpoint module 150 (e.g., the stop classification module 703, the group module 709, etc.). In another embodiment, the fourth communication module 701 receives data (e.g., one or more data elements) from components of the endpoint module 150 (e.g., the group module 709) and stores the data in the storage 118. One skilled in the art will recognize that the fourth communication module 701 may provide other functionality described herein.

The stop classification module 703 is code and routines that, when executed by the processor 104, determines a type of a stop occurred in a journey. The stop classification module 703 is communicatively coupled to the bus 220 via signal line 724. A type of a stop is one of a system-not-ready stop, a long stop, an intermediate stop, a pickup-and-delivery stop and a short stop. In one embodiment, a pickup-and-delivery stop is a subcategory of an intermediate stop. In another embodiment, a pickup-and-delivery stop is a subcategory of a short stop. One skilled in the art will recognize that other types of the stop are possible.

A system-not-ready stop is a stop with a "not ready" system status of a vehicle. For example, a system-not-ready stop is a stop of a vehicle with the combustion engine off. As another example, a system-not-ready stop is a stop at a destination of a journey with the ignition key pulled out from the keyhole. In one embodiment, a "not ready" system status indicates that the vehicle is not ready for driving because the engine is at an "off" status. In one embodiment, a system-not-ready stop is a stop with a stop duration (e.g., stop time) greater than a minimum threshold (e.g., one minute) and with a "not ready" system status. A minimum threshold is a lower bound of a time threshold that a stop is determined. For example, assume a minimum threshold is ten seconds. If a vehicle stops for less than ten seconds, the stop is ignored. In one embodiment, the minimum threshold is determined by an administrator of the navigation system 102.

A long stop is a stop with a stop duration greater than a long-stop threshold and with a "ready" system status. A long-stop threshold is a lower bound of a time threshold for a long stop such that each long stop has a stop duration greater than the long-stop duration. For example, if the long-stop threshold is five minutes, a long stop is a stop with a stop duration greater than five minutes and with a "ready" system status of the vehicle. In one embodiment, the long-stop threshold is determined by an administrator of the navigation system 102.

A "ready" system status of a vehicle indicates that the vehicle is ready for driving. For example, a "ready" system status indicates that the combustion engine is at an "on" status and the vehicle is ready to go. In one embodiment, an engine of a vehicle with a wireless ignition key is started by pushing a button on a dash board without inserting a physical ignition key to a keyhole. The vehicle turns to a "ready" system status if the button is pushed and a "ready" indicator will be shown in the dash board.

An intermediate stop is a stop with an intermediate stop duration and with a "ready" system status of a vehicle. For example, an intermediate stop is a stop at a railway, a drive-through stop at a coffee shop, a stop because of heavy traffic and a stop at traffic lights, etc. An intermediate stop duration is a stop duration between an intermediate threshold and a long-stop threshold (e.g., between two minutes and five minutes). An intermediate threshold is a lower bound of a time threshold for defining an intermediate stop. For example, an intermediate threshold is two minutes. The intermediate threshold is greater than the minimum threshold and less than the long-stop threshold, and therefore the intermediate stop has a stop duration shorter than a long stop. In one embodiment, the intermediate threshold is determined by an administrator of the navigation system 102.

A short stop is a stop with a stop duration between a minimum threshold and an intermediate threshold and with a "ready" system status. For example, a short stop is a stop with a stop duration between ten seconds and two minutes such as a stop on the road due to slow traffic in rush hours. In one embodiment, a short stop has a stop duration less than an intermediate stop.

A pickup-and-delivery stop is a stop with a stop duration between a minimum threshold and a long-stop threshold, with a "ready" system status of a vehicle and with window and/or door activities at the stop. In one embodiment, a pickup-and-delivery stop is an intermediate stop with additional window and/or door activities such as window and/or door opening and closing. In another embodiment, a pickup-and-delivery stop is a short stop with additional window and/or door activities. In yet another embodiment, a pickup-and-delivery stop additionally includes sensor data indicating a change of a journey direction after the stop. For example, a pickup-and-delivery stop is a stop at a school that a parent drops off a child at the school gate and then continues to drive to work in a different direction. The pickup-and-delivery stop, the system-not-ready stop, the long stop, the short stop and the intermediate stop are summarized in a table shown in FIG. 20.

In one embodiment, the stop classification module 703 receives a stream of data from the GPS 110. The stream of data includes a first data element and a second data element. In another embodiment, the stop classification module 703 receives a set of sensor data describing one or more measurements of a system status of a vehicle (e.g., "not ready" or "ready"), a speed for the vehicle, door and/or window activities (e.g., door and/or window opening and/or closing) for the vehicle from one or more sensors 170.

The stop classification module 703 determines a time difference between a first timestamp included in the first data element and a second timestamp included in the second data element. The stop classification module 703 determines a system status from the set of sensor data. For example, the stop classification module 703 determines whether the system status is "ready" or "not ready" from the sensor data describing the system status for the vehicle. In one embodiment, the stop classification module 703 determines a speed for the vehicle from the set of sensor data. For example, the stop classification module 703 determines that the speed for the vehicle is less than 1 mile per hour for the first data element from the sensor data describing a velocity of the vehicle. In another embodiment, the stop classification module 703 determines one or more activities of a door and/or window of a vehicle based at least in part on the sensor data. For example, the stop classification module 703 determines that a door is opened and then closed from the sensor data describing the door activities.

In one embodiment, the stop classification module 703 detects that a stop has occurred in a journey based at least in part on the stream of data and the set of sensor data. For example, the stop classification module 703 calculates a distance and a time traveled by the vehicle based on the stream of data and determines that the vehicle has stopped based on a zero distance and a non-zero time traveled by the vehicle. The distance traveled by the vehicle is a distance difference between a first geographic location and a second geographic location included in the stream of data. The time traveled by the vehicle is a time difference between a first timestamp and a second timestamp included in the stream of data. In one embodiment, the stop classification module 703 determines that the vehicle has stopped based on the sensor data describing a "not-ready" system status of the vehicle. In another embodiment, the stop classification module 703 determines that the vehicle has stopped based on the sensor data describing a zero speed for the vehicle.

In another embodiment, the stop classification module 703 detects a stop for the vehicle further based on accuracy data describing a known accuracy of the GPS 110. For example, the stop classification module 703 retrieves the accuracy data from the storage 118 and adjusts the distance and time traveled by the vehicle based on the accuracy data. The stop classification module 703 detects a stop for the vehicle based on the adjusted distance and time traveled by the vehicle as described above. In one embodiment, the accuracy data is determined based at least in part on human experience. In another embodiment, the accuracy data is determined based at least in part on objective measurements of the accuracy of the GPS 110. For example, the stop classification module 703 determines the accuracy of the GPS 110 by testing the GPS 110 at one or more test locations. The stop classification module 703 stores the determined accuracy data in the storage 118.

In one embodiment, the stop classification module 703 applies one or more metric criteria to the first data element and the second data element to determine a type of the stop. A metric criterion is data for determining a type of a stop. Examples of a metric criterion are described below. A metric criterion is associated with one or more of a system status of a vehicle, a stop duration (or, a stop time), a speed for the vehicle, door activities and/or window activities associated with the vehicle, etc. In one embodiment, the stop classification module 703 applies the one or more metric criteria to the stream of data to determine a type of a stop based at least in part on the set of sensor data and the timestamps and geographic positions included in the stream of data. For example, the stop classification module 703 analyzes the one or more metric criteria and determines that the type of the stop is one of a system-not-ready stop, a long stop, a short stop, an intermediate stop and a pickup-and-delivery stop as described below in more detail.

The stop classification module 703 determines that the type of the stop is a system-not-ready stop if one or more of the following metric criteria are satisfied: (1) the time difference between the first timestamp and the second timestamp is greater than the minimum threshold (e.g., one minute); (2) the system status is "not ready;" and (3) the speed for the vehicle is less than one mile per hour for the first data element. For example, the stop classification module 703 determines the type of stop as a system-not-ready stop if the driver parks the vehicle in a parking spot and pulls out the ignition key.

The stop classification module 703 determines that the type of the stop is a long stop if one or more of the following metric criteria are satisfied: (1) the time difference between the first timestamp and the second timestamp is greater than the long-stop threshold (e.g., five minutes); (2) the system status for the vehicle is "ready;" and (3) the speed for the vehicle is less than one mile per hour for the second data element. For example, the stop classification module 703 determines the type of the stop as a long stop if the driver parks a vehicle on a parking spot with the engine on and stays in the vehicle for more than five minutes before driving away from the parking spot.

The stop classification module 703 determines that the type of the stop is an intermediate stop if one or more of the following metric criteria are satisfied: (1) the time difference between the first timestamp and the second timestamp is greater than the intermediate threshold and less than the long-stop threshold (e.g., between two minutes and five minutes); (2) the system status for the vehicle is "ready;" and (3) an approximate linear direction of travel is detected. For example, the stop classification module 703 determines the type of the stop as an intermediate stop if the stop is caused by traffic lights. A linear direction of travel is a travel pattern characteristic indicating that a vehicle travels from a first location to a second location approximately in a straight line. For example, a vehicle moving from a first location on a straight road to a second location on the same road is traveled in a linear direction of travel.

The stop classification module 703 determines that the type of the stop is a pickup-and-delivery stop if one or more of the following criteria are satisfied: (1) the time difference between the first timestamp and the second timestamp is greater than the minimum threshold and less than the long-stop threshold (e.g., between one minute and five minutes); (2) the system status for the vehicle is "ready;" (3) the sensor data indicates window and/or door activities detected for the vehicle; and (4) the sensor data indicates a change in the travel direction (e.g., the sensor data indicates that the travel direction has been changed to an opposite direction after the stop).

The stop classification module 703 determines that the type of the stop is a short stop if one or more of the following metric criteria are satisfied: (1) the time difference between the first timestamp and the second timestamp is greater than the minimum threshold and less than the intermediate threshold (e.g., between ten seconds and two minutes); (2) the system status for the vehicle is "ready;" (3) a change in geographic positions (e.g., a non-zero distance traveled by the vehicle such as five meters); and (4) no door and/or window activities have occurred. For example, the stop classification module 703 determines the type of the stop as a short stop if the stop is incurred by a slow traffic.

The stop classification module 703 sends the type of the stop to the endpoint establishment module 705. It will be obvious to one skilled in the art that the stop classification module 703 may apply other metric criteria to determine the type of the stop.

The endpoint establishment module 705 is code and routines that, when executed by the processor 104, establishes a journey destination endpoint for a journey. For example, the endpoint establishment module 705 receives a type of a stop occurred in a journey from the stop classification module 703 and determines a journey destination endpoint for the journey based at least in part on the type of the stop. The endpoint establishment module 705 is communicatively coupled to the bus 220 via signal line 726.

A journey destination endpoint is a point at which a journey completes. For example, a journey destination endpoint is an ultimate destination of a trip. In one embodiment, a trip includes one or more journeys and has one or more intermediate destinations and an ultimate destination. For example, if a trip has an intermediate destination and an ultimate destination, the trip includes a first journey from the start point of the trip to the intermediate destination and a second journey from the intermediate destination to the ultimate destination. An intermediate destination is a point that a user visits on the way to the ultimate destination of the trip. In one embodiment, a journey destination endpoint is an intermediate destination of the trip.

For example, if a parent picks up a child at a school when driving home from work, the school is a first journey destination endpoint for a first journey from work to school (or, the school is an intermediate destination of the entire trip from work to home) and the home is a second journey destination endpoint for a second journey from school to home (or, the home is the ultimate destination of the entire trip from work to home).

A type of a trip is one of a circular trip and a non-circular trip. A circular trip is a trip whose ultimate destination is within a distance threshold (e.g., 1,000 feet) of a start point of the trip. In one embodiment, the distance threshold is configured by an administrator of the navigation system 102. In one embodiment, a user takes a circular trip with a "ready" system status of the vehicle during the entire trip. For example, although the user stops at one or more intermediate destinations in the circular trip, the engine of the vehicle is on during the entire trip. An example of a circular trip is a trip that a parent drives a child to school from home, drops the child off at the school and then drives home from school. The parent may stay at the driver seat during the entire trip without leaving the vehicle and turning off the engine. The parent may park the vehicle at a different location such as in a garage or on the street when returning home from school. A non-circular trip is a trip whose ultimate destination is not within a distance threshold of a start point of the trip. For example, a non-circular trip is a trip from home to work with a distance of 30 miles.

In one embodiment, the endpoint establishment module 705 determines whether the type of the stop received from the stop classification module 703 is a long stop. If the type of the stop is a long stop, the endpoint establishment module 705 establishes the long stop as a journey destination endpoint. If the type of the stop is not a long stop, the endpoint establishment module 705 determines whether the type of the stop is other type of stop such as a system-not-ready stop or a pickup-and-delivery stop, etc.

If the type of the stop is a system-not-ready stop, the endpoint establishment module 705 establishes the system-not-ready stop as a journey destination endpoint. The system-not-ready stop is the most common journey destination endpoint since, for example, the system-not-ready stop with a "not ready" system status (e.g., with an ignition key pulled out from the keyhole) indicates an end of a journey.

If the type of the stop is not a system-not-ready stop, the endpoint establishment module 705 determines whether the type of the stop is a pickup-and-delivery stop. If the type of the stop is a pickup-and-delivery stop, the endpoint establishment module 705 establishes the pickup-and-delivery stop as a journey destination endpoint. Otherwise, the endpoint establishment module 705 does not consider the stop as any journey destination endpoint.

In another embodiment, the endpoint establishment module 705 determines a type of a trip that a user takes. For example, the endpoint establishment module 705 receives a start point of a trip from the GPS 110 (or, the origin ID module 403) and an estimated destination associated with the highest quality score from the quality module 209. The endpoint establishment module 705 determines a type of the trip based at least in part on the start point and the estimated destination. For example, if the estimated destination is within the distance threshold of the start point, the endpoint establishment module 705 determines the type of the trip as a circular trip. Otherwise, the endpoint establishment module 705 determines the type of the trip as a non-circular trip.

For a non-circular trip, the endpoint establishment module 705 determines whether the type of the stop received from the stop classification module 703 is one of a long stop, a system-not-ready stop and a pickup-and-delivery stop. The endpoint establishment module 705 then performs operations as described above based on the determination. For example, if the endpoint establishment module 705 determines that the type of the stop is a system-not-ready stop, the endpoint establishment module 705 establishes the system-not-ready stop as a journey destination endpoint.

If the type of the stop is not a system-not-ready stop, the endpoint establishment module 705 determines whether the type of the stop is one of a pickup-and-delivery stop and a long stop, etc. If the type of the stop is one of a pickup-and-delivery stop and a long stop, the endpoint establishment module 705 establishes the stop (e.g., the pickup-and-delivery stop or the long stop) as a journey destination endpoint. Otherwise, the endpoint establishment module 705 does not consider the stop as any journey destination endpoint.

For a circular trip, the endpoint establishment module 705 determines whether the type of the stop is an intermediate stop. If the type of the stop is an intermediate stop, the endpoint establishment module 705 determines whether there are multiple intermediate stops existing in the trip. If there is only one intermediate stop existing in the trip, the endpoint establishment module 705 establishes the intermediate stop as a journey destination endpoint. The trip is divided into two journeys with a first journey from a start point of the trip to the intermediate stop and a second journey from the intermediate stop to the ultimate destination of the trip. If there are multiple intermediate stops existing in the trip, the endpoint establishment module 705 determines whether any pickup-and-delivery stops exist. If there is at least one pickup-and-delivery stop in the trip, the endpoint establishment module 705 establishes each of the pickup-and-delivery stop as a journey destination endpoint.

If there is no pickup-and-delivery stop among the multiple intermediate stops in the trip, the endpoint establishment module 705 selects an intermediate stop that is most similar to a pickup-and-delivery stop based on one or more metric criteria described above. The endpoint establishment module 705 establishes the selected intermediate stop as a journey destination endpoint. For example, the endpoint establishment module 705 selects an intermediate stop with a change of travel direction (e.g., an opposite travel direction after the stop) as a journey destination endpoint.

If the type of the stop is not an intermediate stop, the endpoint establishment module 705 determines whether the type of the stop is a short stop. If the type of the stop is not a short stop, in one embodiment the endpoint establishment module 705 determines whether the type of the stop is one of a long stop and a system-not-ready stop as described above with reference to a non-circular trip. In another embodiment, the endpoint establishment module 705 does not consider the stop as a journey destination endpoint. If the type of the stop is a short stop, the endpoint establishment module 705 selects a short stop that is most similar to a pickup-and-ready stop based on one or more metric criteria and establishes the selected short stop as a journey destination endpoint. For example, the endpoint establishment module 705 selects a short stop with a change of travel direction (e.g., an opposite travel direction after the stop) as a journey destination endpoint.

After establishing a journey destination endpoint as described above, the endpoint establishment module 705 associates the journey destination endpoint with retrieval identification data. For example, the endpoint establishment module 705 associates the journey destination endpoint with unique retrieval identification data such as a unique retrieval identifier (ID) and a unique user ID. The user ID identifies a user that visits the journey destination endpoint.

In one embodiment, the endpoint establishment module 705 generates an endpoint score for the established journey destination endpoint. An endpoint score for an established journey destination endpoint is data for measuring a degree of matching between the established journey destination endpoint and a journey destination endpoint that a user actually intends to visit. For example, assume that a user intends to go to a shopping mall and makes a system-not-ready stop at the shopping mall (e.g., a stop with an ignition key being pulled out). The endpoint establishment module 705 establishes the system-not-ready stop at the shopping mall as a journey destination endpoint. The endpoint establishment module 705 generates a full endpoint score (e.g., 100 points) for the established journey destination endpoint because the established journey destination endpoint is matched to the journey destination endpoint that the user wants to visit.

In one embodiment, the endpoint establishment module 705 generates the endpoint score for the journey destination endpoint based at least in part on the type of the stop that the journey destination endpoint is associated with. For example, the endpoint establishment module 705 generates a higher endpoint score for a journey destination endpoint associated with a system-not-ready stop than a journey destination endpoint associated with a long stop since, for example, a system-not-ready stop with the engine off (e.g., an ignition key being pulled out) is more likely to match to the actual destination that the user intends to visit than a long stop with the engine on. As another example, the endpoint establishment module 705 generates a higher endpoint score for a journey destination endpoint associated with a pickup-and-delivery stop than a journey destination endpoint associated with a short stop.

In one embodiment, the endpoint establishment module 705 sends one or more of the journey destination endpoint, the retrieval identification data and the endpoint score to the report module 707. In another embodiment, the endpoint establishment module 705 stores the journey destination endpoint and the associated retrieval identification data as a part of the endpoint data 343 in the storage 118. The endpoint establishment module 705 also stores the endpoint score associated with the journey destination endpoint in the storage 118. In yet embodiment, the endpoint establishment module 705 only stores the journey destination endpoint with an endpoint score exceeding a score threshold. The endpoint establishment module 705 ignores any journey destination endpoint with an endpoint score below the score threshold. In one embodiment, the score threshold is a threshold set by an administrator of the navigation system 102.

It is particularly advantageous to collect data describing journey destination endpoints for a user since, for example, the collected data may be used by the learning system 112 and/or the estimation system 114 described above to provide one or more estimated destinations for one or more potential journeys without requiring the user to input any destination data. Furthermore, the detection of frequent intermediate stops and/or short stops may indicate heavy traffic on the road and therefore enables the system 100 to alert a driver of abnormal roadway conditions.

The report module 707 is code and routines that, when executed by the processor 104, reports a journey destination endpoint to a social network application 122. For example, the report module 707 receives a journey destination endpoint from the endpoint establishment module 705 and reports the journey destination endpoint to a social network provided by the social network application 122 via the network 105. In one embodiment, the report module 707 posts a first data element including a first geographic position and a first timestamp and a second data element including a second geographic position and a second timestamp on the social network. The report module 707 is communicatively coupled to the bus 220 via signal line 728.

The group module 709 is code and routines that, when executed by the processor 104, manages a group of data elements. The group module 709 is communicatively coupled to the bus 220 via signal line 730. In one embodiment, the group module 709 receives a stream of data including a first data element and a second data element associated with a traveling vehicle from the fourth communication module 701. The group module 709 receives an endpoint score from the endpoint establishment module 705. The endpoint score is associated with a journey destination endpoint determined by the endpoint establishment module 705 based at least in part on the stream of data.

The group module 709 accesses a group including one or more historical data elements. For example, the group module 709 retrieves group data including data describing one or more historical data elements from the storage 118. Each historical data element describes a past geographic position and a past timestamp for a past journey. In one embodiment, the group module 709 compares the first data element and the second data element with a time constraint and a distance constraint to determine whether the first data element and the second data element satisfy the time constraint and the distance constraint as described below. The group module 709 adds the first data element and the second data element to the group if the first data element and the second data element satisfy the time constraint and the distance constraint. In one embodiment, the time constraint and the distance constraint are configured by an administrator of the navigation system 102.

In one embodiment, the group module 709 determines a time difference between a first timestamp of a first data element and a second timestamp of a second data element (e.g., a time duration that a second timestamp occurs after the first timestamp). The group module 709 determines whether the time difference satisfies a time constraint. For example, the group module 709 determines whether the time different is negative. If the time difference does not satisfy the time constraint (e.g., the time difference is negative) which indicates an error occurred due to noise, weak GPS signals or absence of GPS signals, the group module 709 ignores the stream of data including the first data element and the second data element.

If the time difference satisfies the time constraint (e.g., the time difference is not negative), the group module 709 determines a distance difference between a first geographic position of the first data element and a second geographic position of the second data element included in the stream of data. The group module 709 determines whether the distance difference satisfies a distance constraint. For example, the group module determines whether the distance difference is a normal distance difference based on experience. If the distance difference satisfies the distance constraint, the group module 709 adds the first data element and the second data element to the group as a part of historical data elements.

If the distance difference does not satisfy the distance constraint (e.g., the distance difference is abnormal such as a distance difference of twenty miles in one minute) indicating that an error has occurred due to noise or weak GPS signals, the group module 709 ignores the stream of data including the first data element and the second data element. The group module 709 also instructs the endpoint establishment module 705 to ignore the journey destination endpoint determined based at least in part on the abnormal stream of data.

In another embodiment, the group module 709 compares the received endpoint score to a score threshold. If the endpoint score is below the score threshold, the group module 709 ignores the stream of data associated with the endpoint score. If the endpoint score is above the score threshold, the group module 709 stores the stream of data as a part of the group in the storage 118.

Methods

Figure 8A:
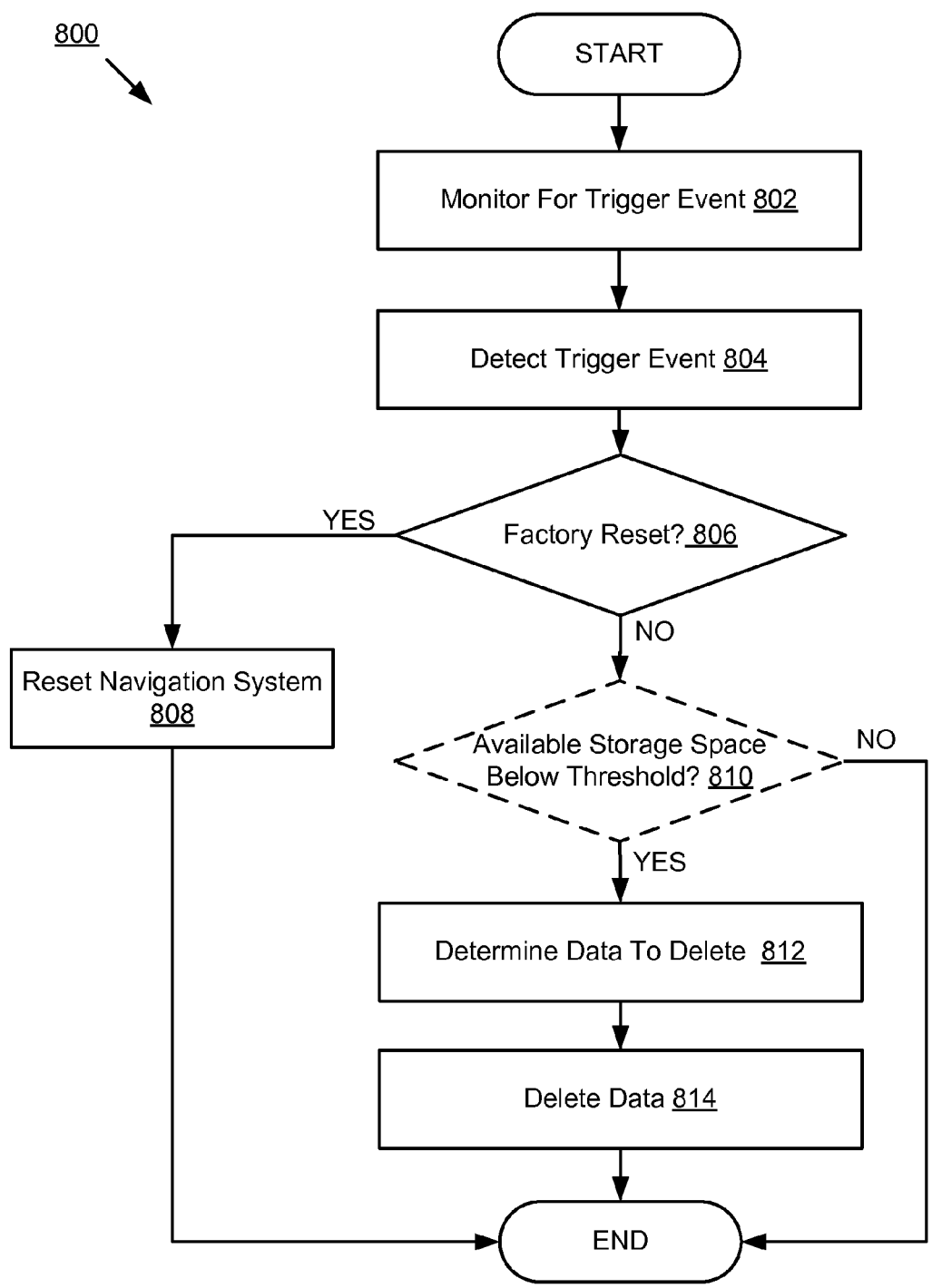
FIG. 8A is a flowchart illustrating a method for forgetting data according to one embodiment.

Referring now to FIGS. 8A-16D, various embodiments of the method of the specification will be described. FIG. 8A is a flowchart illustrating a method 800 for forgetting data according to one embodiment. The monitor module 603 monitors 802 the navigation system 102 for any trigger event. In one embodiment, the monitor module 603 detects 804 a trigger event and sends event data describing the trigger event to the determination module 605. The determination module 605 determines 806 whether the trigger event is a factory reset input. If the trigger event is a factory reset input, the determination module 605 sends a reset signal to the delete module 607 and the method 800 moves to step 808. Otherwise, the method 800 moves to step 810. At step 808, the delete module 607 resets the navigation system 102 responsive to receiving the reset signal and the method 800 ends.

Turning to step 810, the determination module 605 determines whether the available memory in the navigation system 102 (e.g., available storage space in the storage device 118) is below a threshold. If the available memory is not below the threshold, the method 800 ends. Otherwise, the determination module 605 determines 812 data to delete from the memory. In one embodiment, the determination module 605 performs steps similar to those described below with reference to FIG. 8B for determining data to delete from the memory. At step 814, the delete module 607 deletes the determined data from the memory.

Figure 8B:
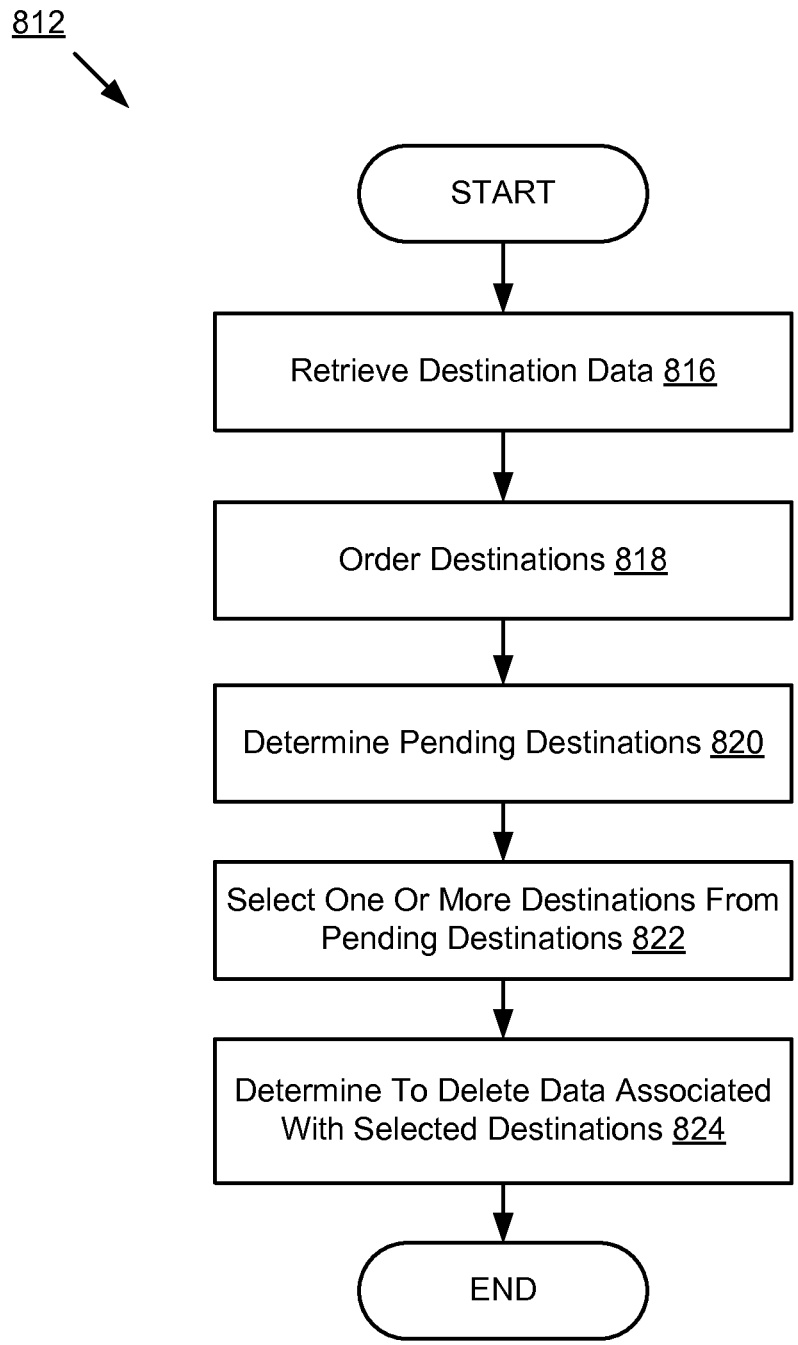
FIG. 8B is a flowchart illustrating a method for determining data to delete according to one embodiment.

FIG. 8B is a flowchart illustrating a method 812 for determining data to delete according to one embodiment. The third communication module 601 retrieves 816 destination data describing all the destinations that a user has visited, timestamp data describing a timestamp for a last visit to each destination and an occurring frequency of each destination stored in a metric table from the storage 118. The third communication module 601 sends the retrieved data to the determination module 605.

The determination module 605 orders 818 the destinations based at least in part on the timestamps for the last visits to the destinations. For example, the determination module 605 orders the destinations in a first queue so that a first destination having an older timestamp is before a second destination having a more recent timestamp. Next, the determination module 605 orders the destinations based at least in part on the occurring frequencies of the destinations. For example, the determination module 605 orders the destinations in a second queue so that a first destination having a lower occurring frequency is before a second destination having a higher occurring frequency.

The determination module 605 determines 820 a set of pending destinations based at least in part on the ordering. For example, the determination module 605 selects a first set of destinations having the oldest timestamps from the first queue and a second set of destinations having the least occurring frequencies from the second queue. The determination module 605 determines the set of pending destinations as one or more destinations included in both the first set of destinations and the second set of destinations.

The determination module 605 selects 822 one or more destinations from the set of pending destinations. In one embodiment, the determination module 605 randomly selects one or more destinations from the set of pending destinations. The determination module 605 determines 824 to delete data associated with the one or more selected destinations. In one embodiment, the determination module 605 sends one or more identifiers of the selected destinations to the delete module 607, causing the delete module 607 to delete data associated with the selected destinations (e.g., a set of learning parameters, learning table data, metric table data, driver history data, etc., associated with the selected destinations).

Figure 9A:
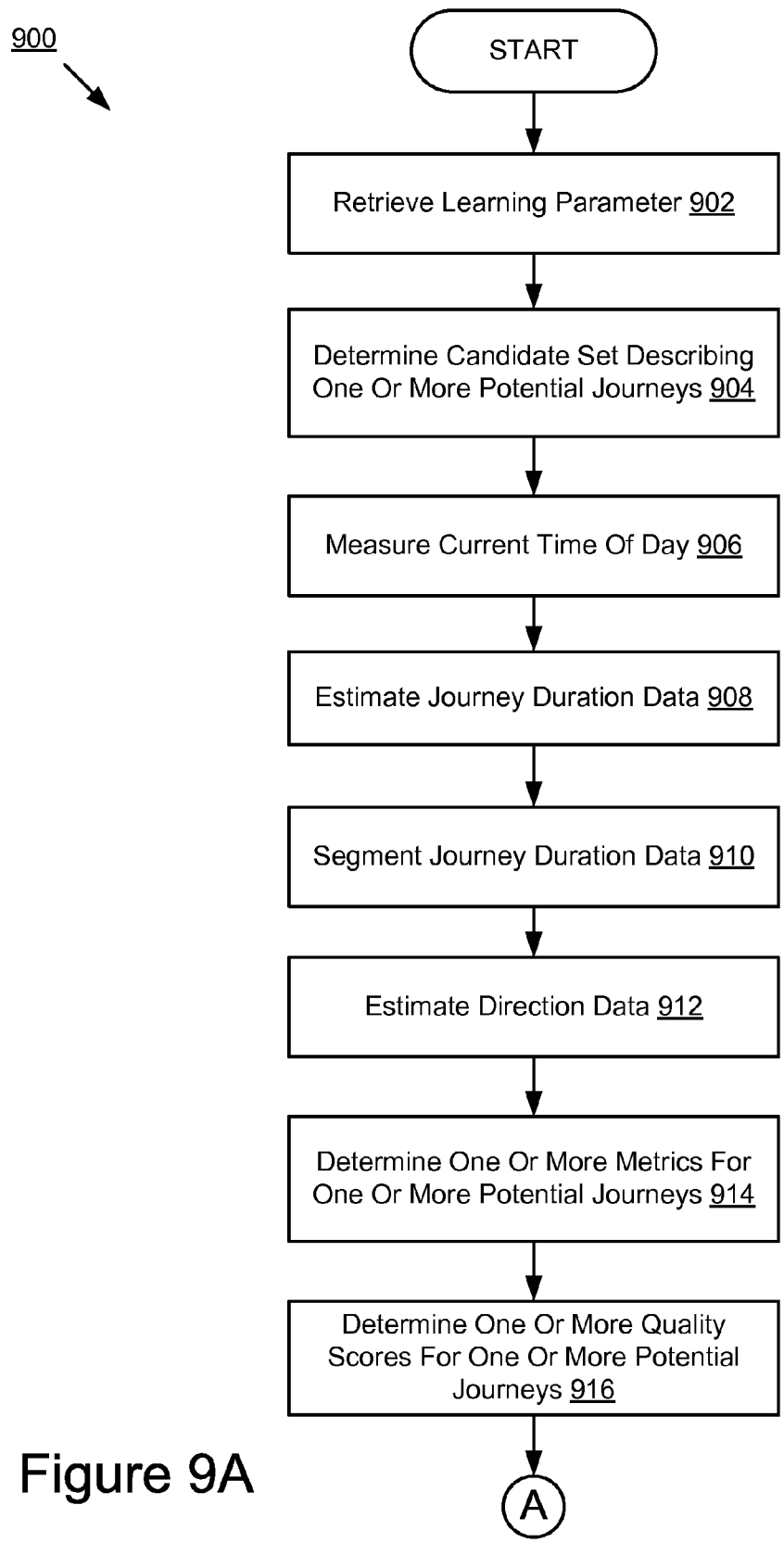
FIGS. 9A and 9B are flowcharts illustrating a method for determining one or more potential journeys to one or more destinations according to one embodiment.
Figure 9B:
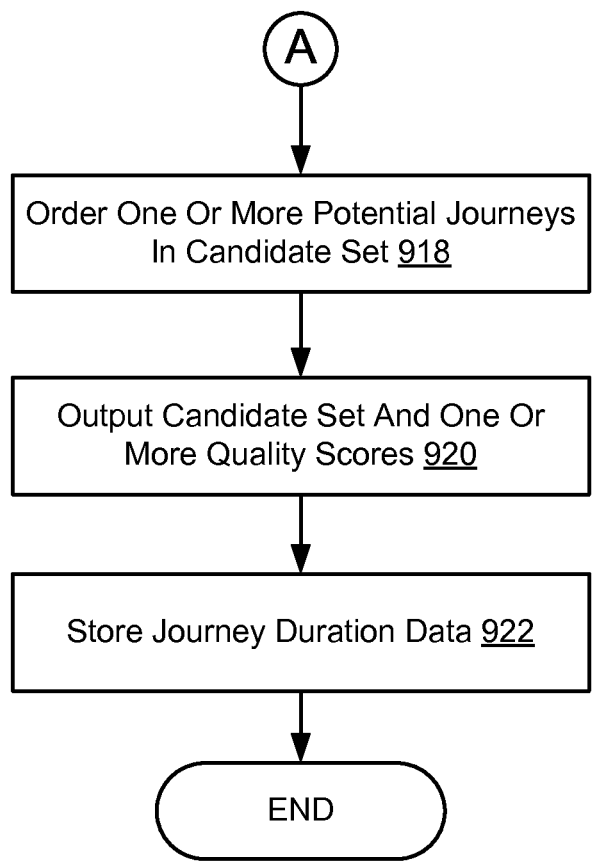

FIGS. 9A and 9B are flowcharts illustrating a method 900 for determining one or more potential journeys according to one embodiment. Referring to FIG. 9A, the first communication module 201 retrieves 902 a set of learning parameters including driver history data describing one or more past journeys from the storage 118. In one embodiment, the first communication module 201 retrieves a set of learning parameters including converted driver history data from the storage 118. The first communication module 201 sends the set of learning parameters to the frequency module 206.

The frequency module 206 analyzes the set of learning parameters to determine 904 a candidate set including data describing frequent start locations and frequent end locations for one or more potential journeys to one or more destinations. The timestamp generator 217 measures 906 the current time of day and sends the current time of day to one or more of the duration module 407 and the direction module 405.

The duration module 407 estimates 908 a set of journey duration data for the one or more potential journeys included in the candidate set based at least in part on the current time of day. The duration module 407 sends the set of journey duration data to the conversion module 205. The conversion module 205 segments 910 the journey duration data into non-uniform segments. The conversion module 205 sends the converted journey duration data to the metric module 207.

The direction module 405 estimates 912 direction data describing one or more directions for the one or more potential journeys to the one or more destinations based at least in part on the current time of day. The direction module 405 sends the direction data to the metric module 207. In one embodiment, the direction module 405 sends the direction data to the conversion module 205. The conversion module 205 converts the direction data and sends the converted direction data to the metric module 207.

The metric module 207 determines 914 one or more metrics for the one or more potential journeys based at least in part on one or more of the current time of day, the journey duration data and the direction data. In one embodiment, the metric module 207 determines the one or more metrics based at least in part on a metric estimation network. The metric module 207 sends the one or more metrics to the quality module 209. The quality module 209 determines 916 one or more quality scores for the one or more potential journeys based at least in part on the one or more metrics. In one embodiment, different quality scores are associated with different potential journeys.

Referring now to FIG. 9B, the quality module 209 orders 918 the one or more potential journeys included in the candidate set based at least in part on the associated one or more quality scores. The quality module 209 sends the one or more quality scores to the output module 211, causing the output module 211 to output 920 the candidate set and the one or more quality scores to one or more of the learning system 112, the estimation system 114 and the display 160. The duration module 407 stores 922 the journey duration data in a memory (e.g., the storage 118) accessible by one or more system modules described herein.

Figure 10:
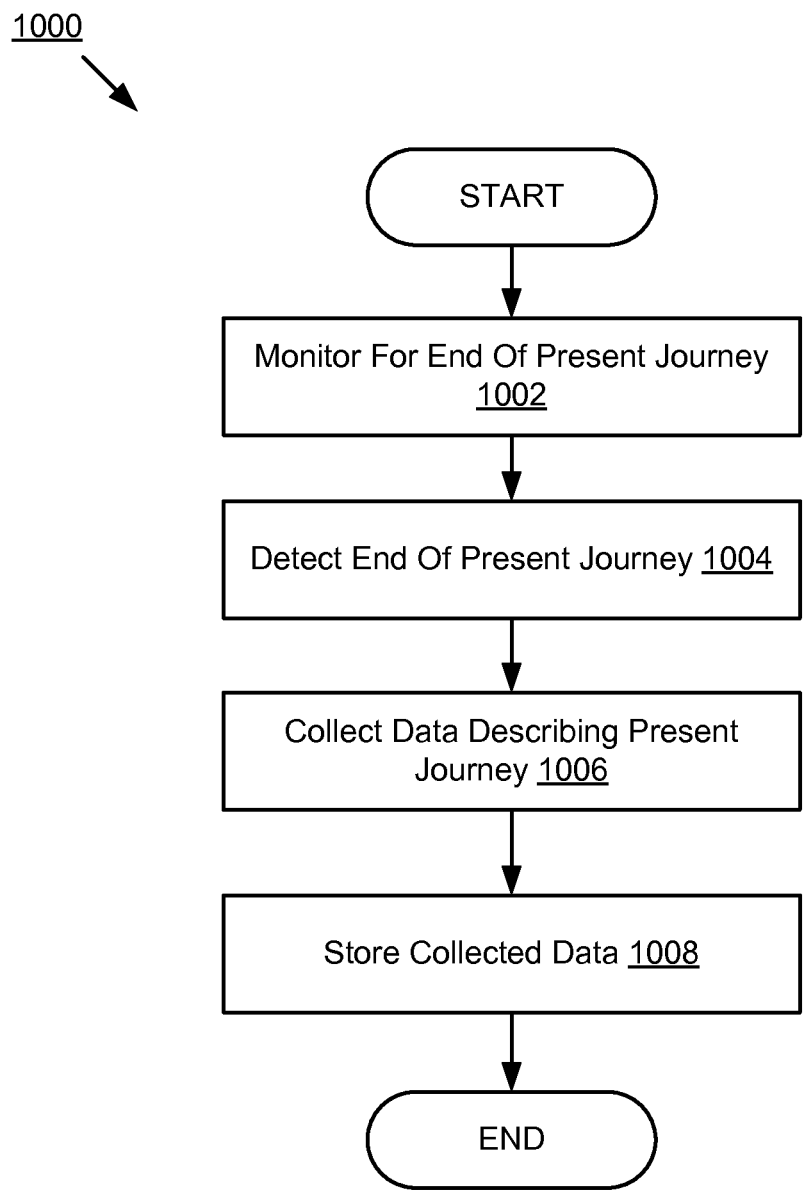
FIG. 10 is a flowchart illustrating a method for logging data for a present journey according to one embodiment.

FIG. 10 is a flowchart illustrating a method 1000 for logging data for a present journey according to one embodiment. The history module 213 monitors 1002 the navigation system 102 for an end of the present journey. For example, the history module 213 receives location data and/or speed data from the GPS 110 and monitors whether a user has arrived at a destination of the present journey based at least in part on the location data and/or the speed data. When the user has arrived at the destination, the history module 213 detects 1004 the end of the present journey. The history module 213 collects 1006 data describing the present journey (e.g., journey duration data, direction data, route data, start location, end location, time of departure, day of departure, date of departure, time of arrival, day of arrival, date of arrival, etc.). The history module 213 stores 1008 the collected data as part of the driver history data in the driver history repository 316.

Figure 11A:
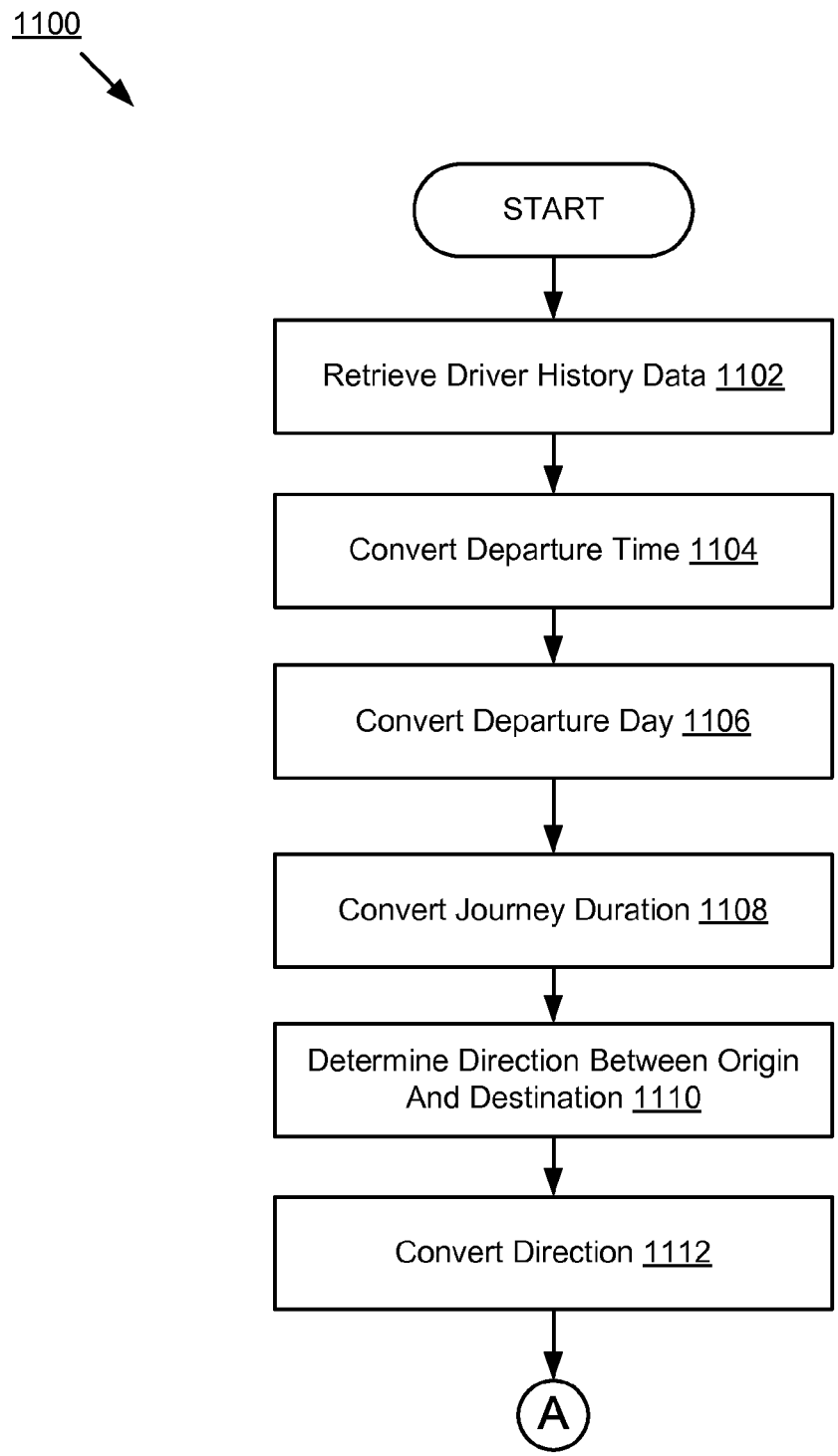
FIGS. 11A and 11B are flowcharts illustrating a method for converting driver history data according to one embodiment.
Figure 11B:
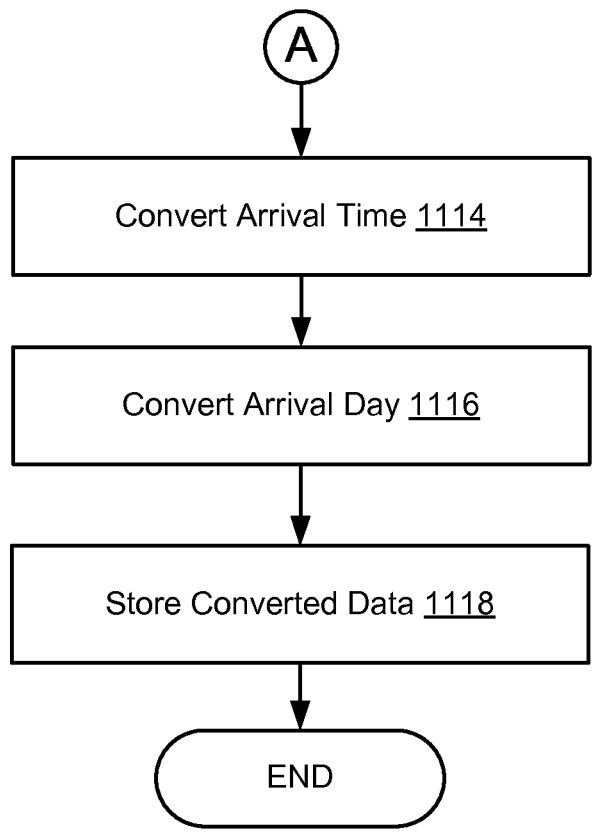

FIGS. 11A and 11B are flowcharts illustrating a method 1100 for converting driver history data according to one embodiment. Referring now to FIG. 11A, the driving history module 203 retrieves 1102 driver history data from the storage 118 via the first communication module 201. The driver history data includes one or more of departure time (e.g., time of departure), departure day (e.g., day of departure,), journey duration data, direction data, arrival time (e.g., time of arrival), arrival day (e.g. day of arrival), start points and end points, etc., associated with one or more past journeys. The driving history module 203 sends the driver history data to the conversion module 205.

The conversion module 205 converts 1104 the departure time for one or more past journeys to non-uniform segments. For example, the conversion module 205 converts the time of departure for a journey into one of midnight, morning, lunch, afternoon and night. The conversion module 205 converts 1106 the departure day to non-uniform segments. For example, the conversion module 205 converts the day of departure for a journey into one of weekday and weekend. The conversion module 205 also converts 1108 the journey duration data into non-uniform segments. For example, the conversion module 205 converts the journey duration data into one of short, medium and long.

In one embodiment, the driving history module 203 sends the start location and the end location to the direction module 405. The direction module 405 determines 1110 a direction for a journey based at least in part on the start location and the end location and sends direction data describing the direction to the conversion module 205. The conversion module 205 converts 1112 the direction to one of a plurality of uniform segments. For example, the conversion module 205 converts the direction to one of east, southeast, south, southwest, west, northwest, north and northeast.

Referring now to FIG. 11B, the conversion module 205 converts 1114 the arrival time to non-uniform segments. For example, the conversion module 205 converts the time of arrival for a journey into one of midnight, morning, lunch, afternoon and night. The conversion module 205 converts 1116 the arrival day to non-uniform segments. For example, the conversion module 205 converts the day of arrival for a journey into one of weekday and weekend. The conversion module 205 stores 1118 the converted driver history data in the storage 118. In one embodiment, the conversion module 205 stores the converted driver history data as a set of learning parameters in the storage 118.

Figure 12:
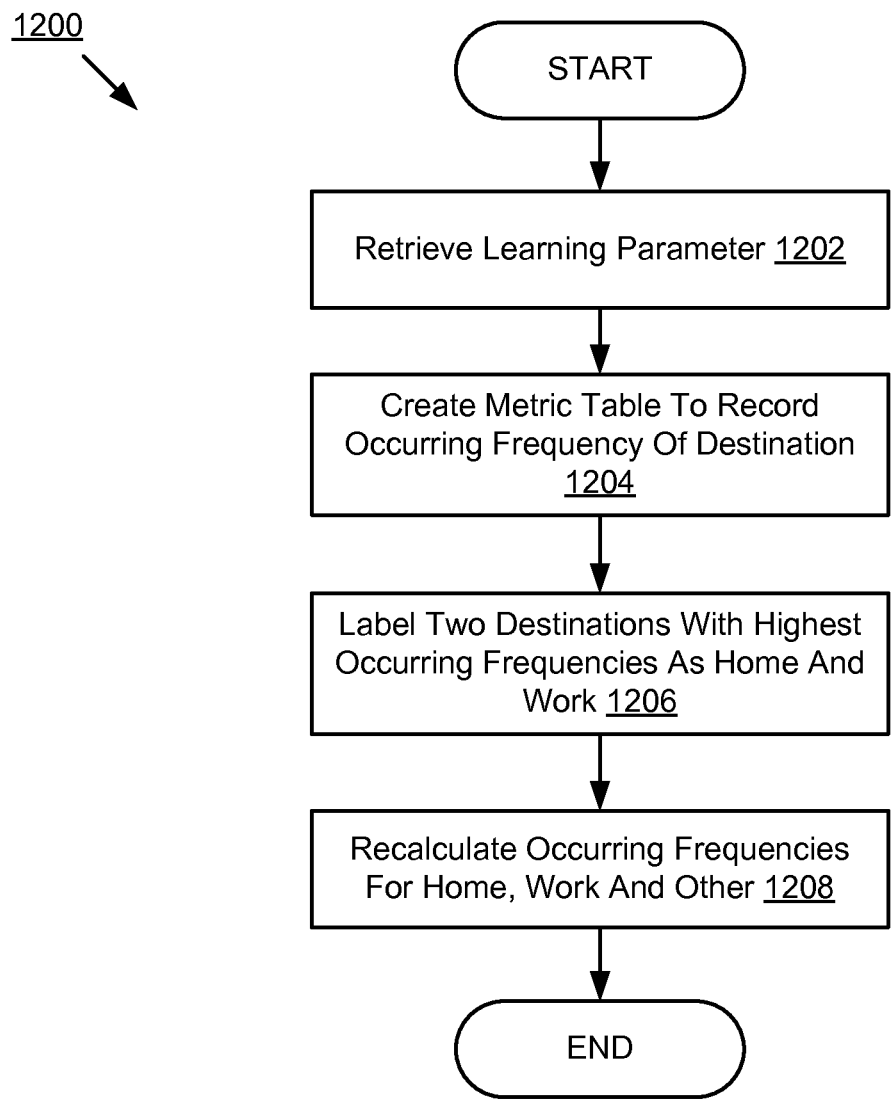
FIG. 12 is a flowchart illustrating a method for learning a driving preference according to one embodiment.

FIG. 12 is a flowchart illustrating a method 1200 for learning a driving preference of a user according to one embodiment. The first communication module 201 retrieves 1202 a set of learning parameters from the storage 118 and sends the set of learning parameters to the frequency module 206. The frequency module 206 creates 1204 a metric table (e.g., a destination table shown as "destTable" in FIG. 19A) to record the occurring frequency of each destination. The frequency module 206 labels 1206 two destinations with the highest occurring frequencies as "Home" and "Work." For example, the frequency module 206 assigns the destination with the highest occurring frequency as "Home" and the destination with the second highest occurring frequency as "Work." The remaining destinations such as gas stations, coffee shops, etc., are referred to as "Other." The frequency module 206 recalculates 1208 the occurring frequencies for the destinations "Home," "Work" and "Other."

Figure 13A:
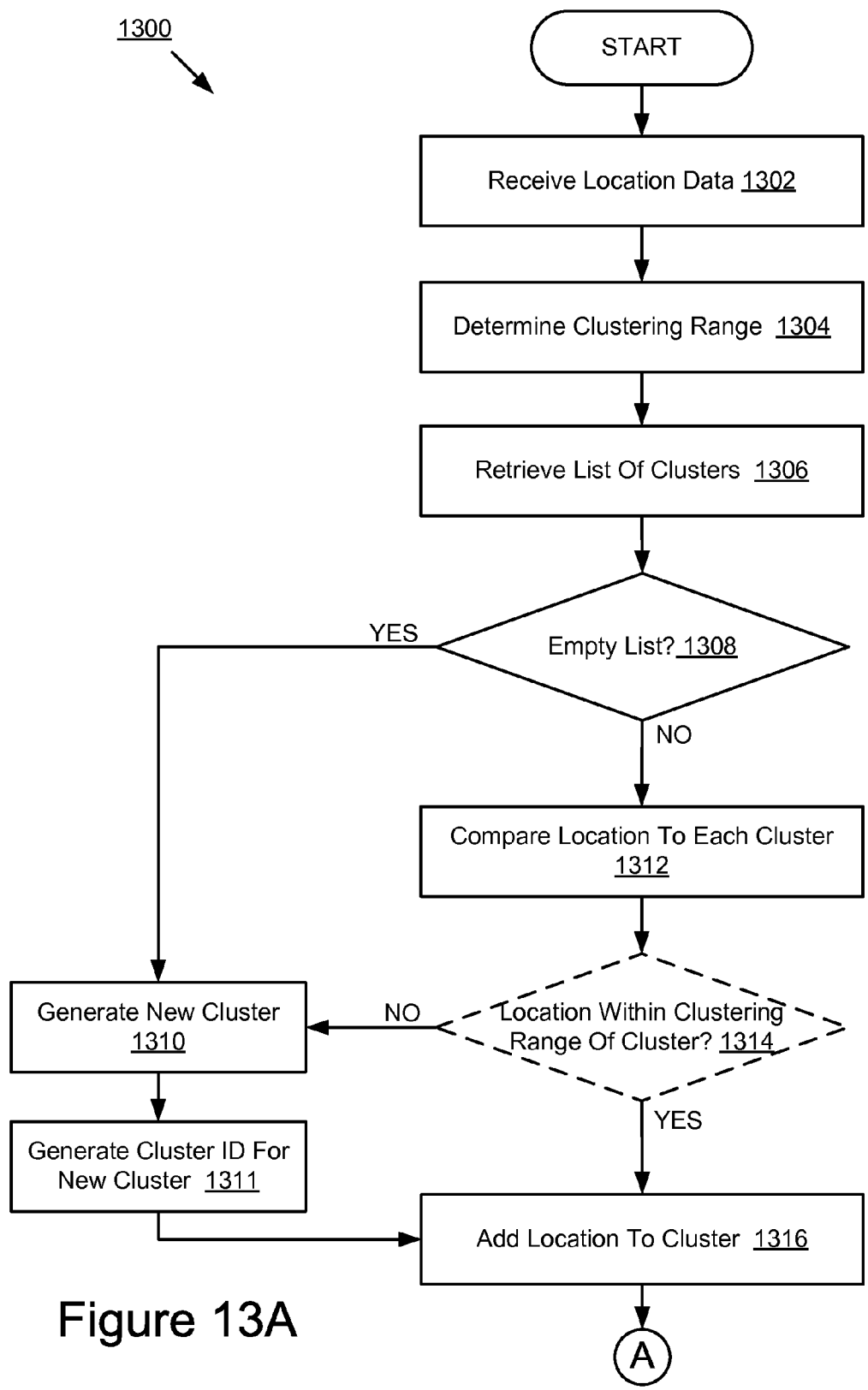
FIGS. 13A and 13B are flowcharts illustrating a method for managing a location in a cluster according to one embodiment.
Figure 13B:
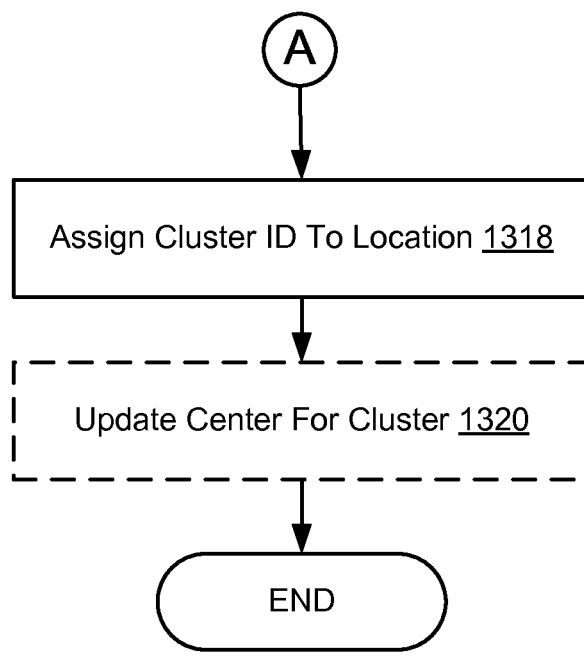

FIGS. 13A and 13B are flowcharts illustrating a method 1300 for managing a location in a cluster according to one embodiment. In one embodiment, the location is one of a location for a start point (e.g., a start location) and a location for an end point (e.g., an end location) of a journey. Referring now to FIG. 13A, the second communication module 401 receives 1302 location data describing a location from the GPS 110. The second communication module 401 sends the location data to the cluster module 404. The cluster module 404 determines 1304 a clustering range (e.g., 200 meters) for a cluster.

The second communication module 401 retrieves 1306 cluster data describing a list of existing clusters from the storage 118 and sends the cluster data to the cluster module 404. The cluster module 404 determines 1308 whether the list is empty. If the list is empty, the method 1300 moves to step 1310. Otherwise, the method 1300 moves to step 1312. Turning to step 1310, the cluster module 404 generates a new cluster. The cluster module 404 generates 1311 a cluster ID for the new cluster and the method 1300 moves to step 1316.

Turning to step 1312, the cluster module 404 compares the location to each cluster included in the list and determines 1314 whether the location is within the clustering range of any existing cluster. If the location is within the clustering range of an existing cluster, the method 1300 moves to step 1316. Otherwise, the method 1300 moves to step 1310. Turning to step 1316, the cluster module 404 adds the location to the cluster. For example, the cluster module 404 adds the location to the existing cluster if the location is within the clustering range of the existing cluster. Alternatively, the cluster module 404 adds the location to the new created cluster.

Referring now to FIG. 13B, the cluster module 404 assigns 1318 the cluster ID of the cluster as a location ID for the location. For example, the cluster module 404 assigns the cluster ID as an origin ID for the location if the location is a location for a start point. The cluster module 404 assigns the cluster ID as a destination ID for the location if the location is a location for an end point. Optionally, the cluster module 404 updates 1320 a cluster center for the cluster after adding the location to the cluster. For example, the cluster module 404 recalculates a cluster center for the cluster based on all the locations included in the cluster.

Figure 14A:
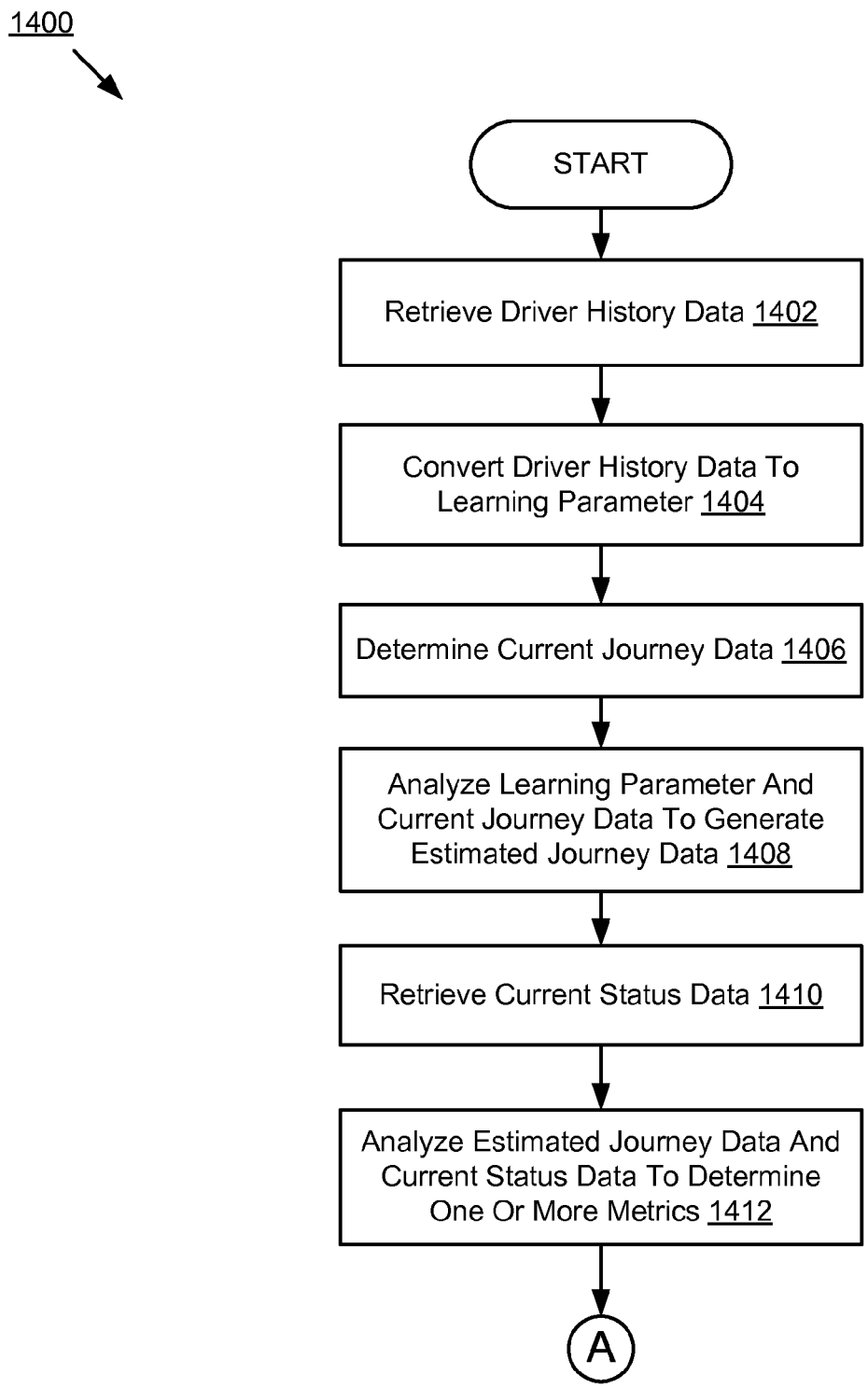
FIGS. 14A-14C are flowcharts illustrating a method for managing abnormal conditions according to one embodiment.
Figure 14B:
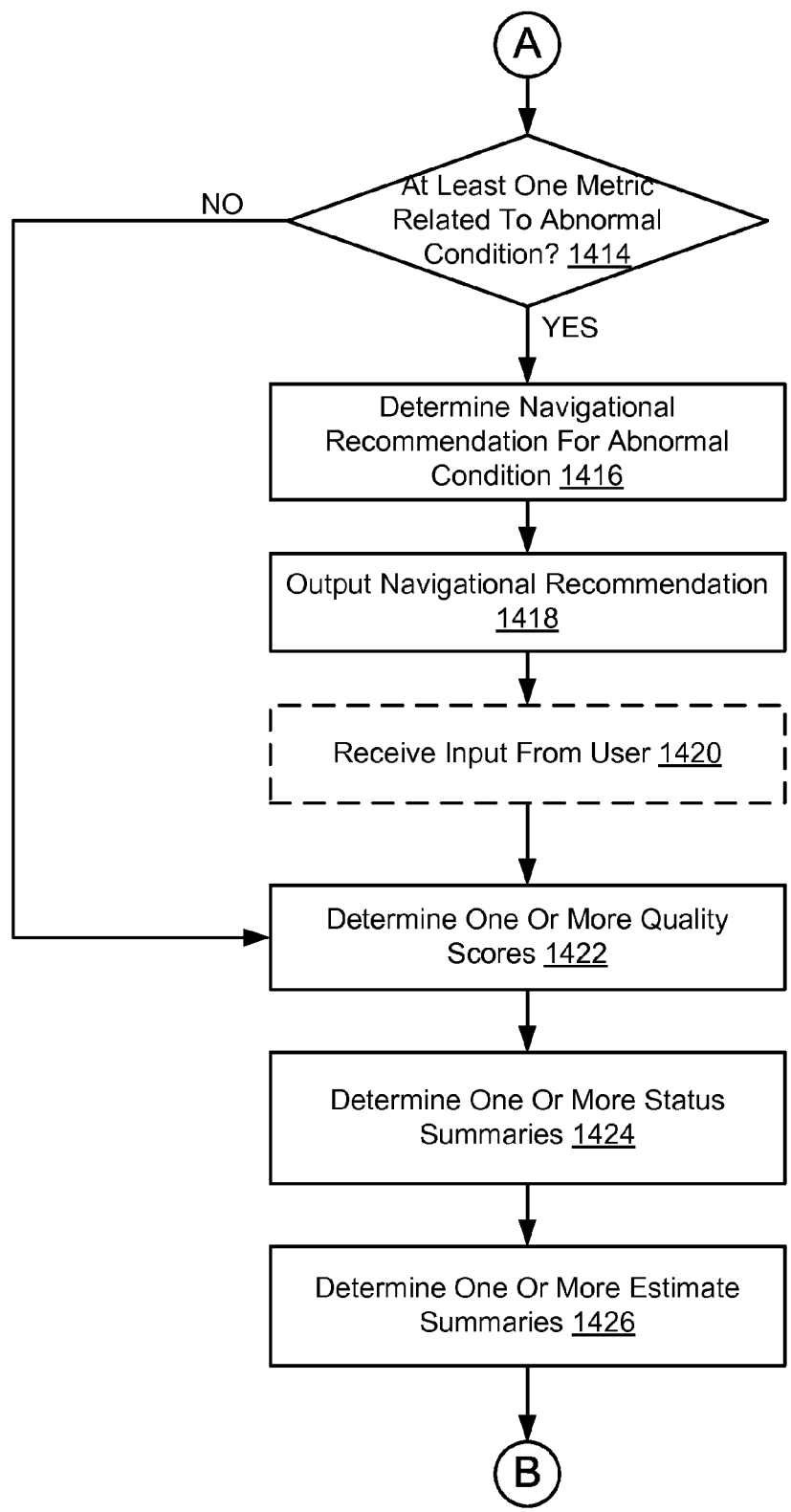
Figure 14C:
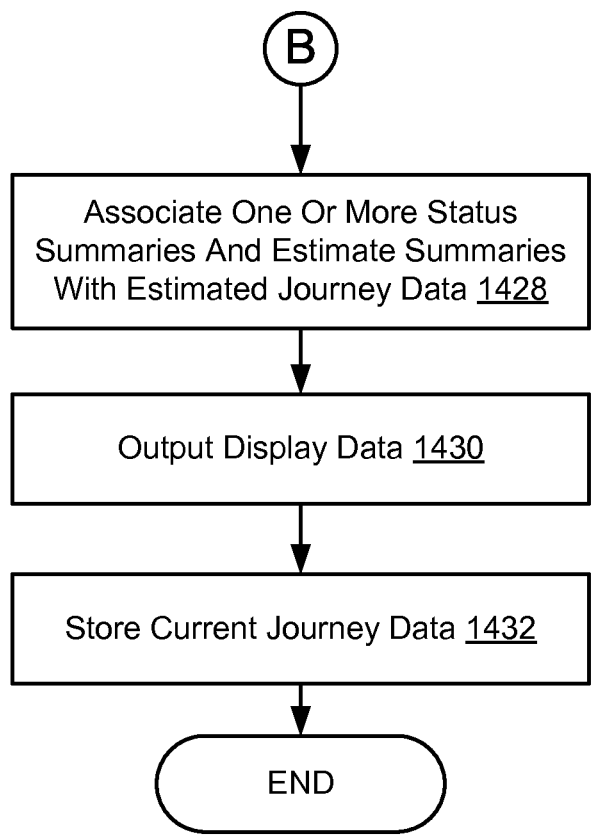

FIGS. 14A-14C are flowcharts illustrating a method 1400 for managing abnormal conditions according to one embodiment. Referring now to FIG. 14A, the driving history module 203 retrieves 1402 driver history data from the storage 118 via the first communication module 201. The driving history module 203 sends the driver history data to the conversion module 205. The conversion module 205 converts 1404 the driver history data to a set of learning parameters. The conversion module 205 sends the set of learning parameters to the frequency module 206.

The origin ID module 403 determines 1406 current journey data and sends the current journey data to one or more of the frequency module 206 and the summary module 210. The frequency module 206 analyzes the set of learning parameters and the current journey data to generate 1408 estimated journey data describing one or more potential journeys from an origin location (e.g., a location for a start point) included in the current journey data to one or more estimated destinations. The frequency module 206 sends the estimated journey data to the metric module 207.

The first communication module 201 retrieves 1410 a set of current status data from the GPS 110 and sends the set of current status data to one or more of the metric module 207 and the summary module 210. The metric module 207 analyzes the estimated journey data and the set of current status data to determine 1412 one or more metrics for the one or more potential journeys described by the estimated journey data.

Referring now to FIG. 14B, the metric module 207 determines 1414 whether at least one metric is related to an abnormal condition. If at least one metric is related to an abnormal condition, the method 1400 moves to step 1416. Otherwise, the method 1400 moves to step 1422. At step 1416, the metric module 207 determines a navigational recommendation for the abnormal condition. The metric module 207 sends the navigational recommendation to the output module 211, causing the output module 211 to output 1418 the navigational recommendation to a user on a display 160. Optionally, the metric module 207 receives 1420 an input from a user via the first communication module 201.

The quality module 209 determines 1422 one or more quality scores associated with the estimated journey data based at least in part on the one or more metrics. The summary module 210 determines 1424 one or more status summaries. The summary module 210 also determines 1426 one or more estimate summaries.

Referring now to FIG. 14C, the summary module 210 associates 1428 the one or more status summaries and the one or more estimate summaries with the estimated journey data. The summary module 210 sends the one or more status summaries and the one or more estimate summaries to the output module 211, causing the output module 211 to output 1430 display data for presenting the one or more status summaries, the one or more estimate summaries and the estimated journey data on the display 160. The origin ID module 403 stores 1432 the current journey data in the storage 118.

Figure 15:
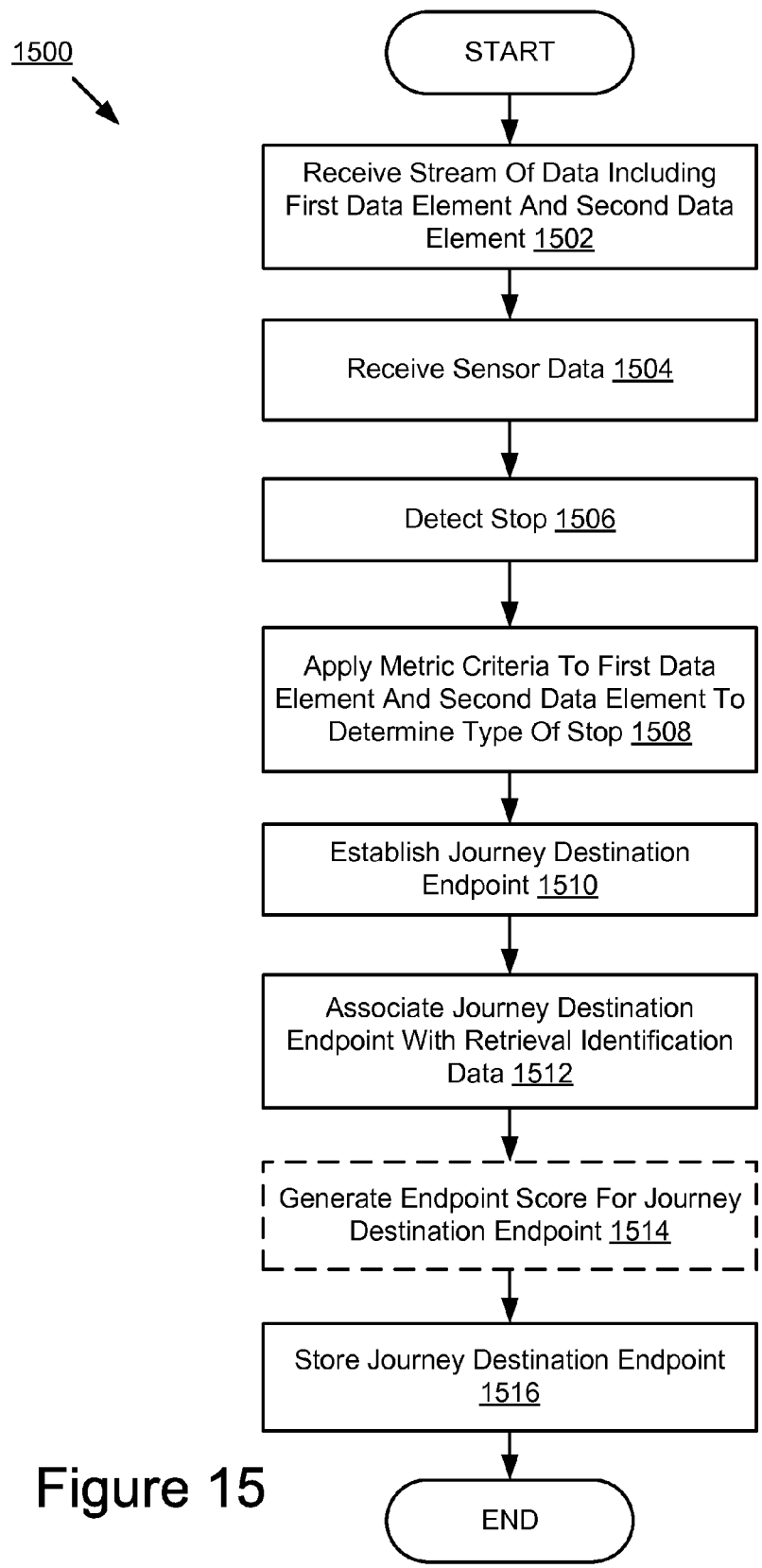
FIG. 15 is a flowchart illustrating a method for determining a journey destination endpoint in a journey according to one embodiment.

FIG. 15 is a flowchart illustrating a method 1500 for establishing a journey destination endpoint according to one embodiment. The fourth communication module 701 receives 1502 a stream of data including a first data element and a second data element from the GPS 110. The fourth communication module 701 receives 1504 a set of sensor data from one or more sensors 170. The fourth communication module 701 sends the stream of data and the set of sensor data to the stop classification module 703. The stop classification module 703 detects 1506 a stop occurred based at least in part on one or more of the stream of data and the set of sensor data. The stop classification module 703 applies 1508 one or more metric criteria to the first data element and the second data element to determine a type of the stop. The stop classification module 703 sends the type of the stop to the endpoint establishment module 705.

The endpoint establishment module 705 establishes 1510 a journey destination endpoint based at least in part on the type of the stop. The endpoint establishment module 705 associates 1512 the journey destination endpoint with retrieval identification data. Optionally, the endpoint establishment module 705 generates 1514 an endpoint score for the journey destination endpoint. The endpoint establishment module 705 stores 1516 the journey destination endpoint in the storage 118. In one embodiment, the endpoint establishment module 705 determines whether the endpoint score is above a score threshold. The endpoint establishment module 705 stores the journey destination endpoint in the storage 118 if the endpoint score is above a score threshold. Otherwise, the endpoint establishment module 705 ignores the journey destination endpoint.

Figure 16A:
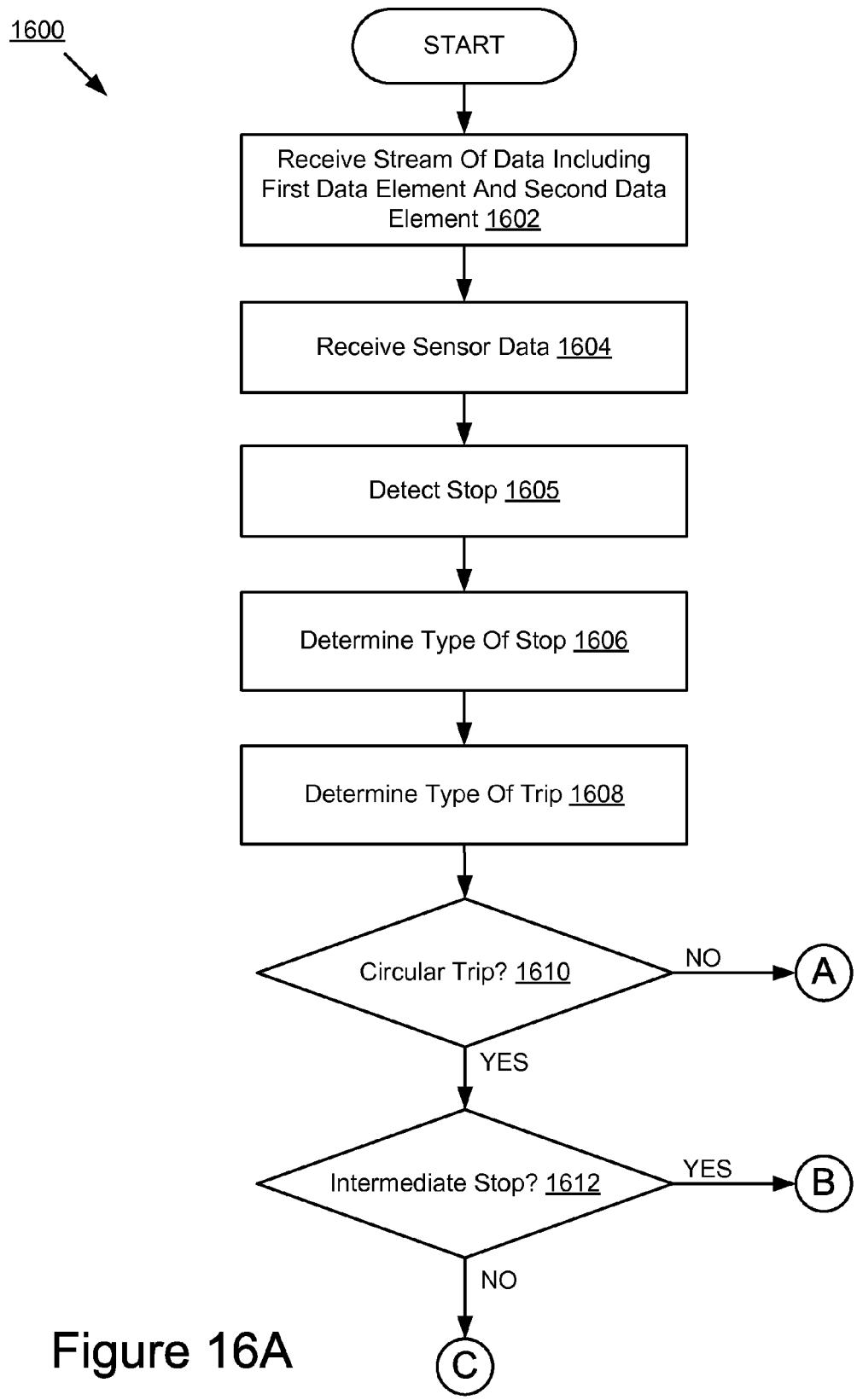
FIGS. 16A-16D are flowcharts illustrating a method for determining a journey destination endpoint in a journey according to another embodiment.

FIGS. 16A-16D are flowcharts illustrating a method 1600 for establishing a journey destination endpoint according to another embodiment. Referring now to FIG. 16A, the fourth communication module 701 receives 1602 a stream of data including a first data element and a second data element from the GPS 110. The fourth communication module 701 receives 1604 a set of sensor data form one or more sensors 170. The fourth communication module 701 sends the stream of data and the set of sensor data to the stop classification module 703. The stop classification module 703 detects 1605 a stop occurred based at least in part on one or more of the stream of data and the set of sensor data. The stop classification module 703 determines 1606 a type of the stop based at least in part on the stream of data and the set of sensor data. For example, the stop classification module 703 applies one or more metric criteria to determine a type of the stop based at least in part on the stream of data and the set of sensor data. The stop classification module 703 sends the type of the stop to the endpoint establishment module 705.

The endpoint establishment module 705 determines 1608 a type of a trip taken by the vehicle. A type of a trip is one of a circular trip and a non-circular trip. The endpoint establishment module 705 determines 1610 whether the type of the trip is a circular trip. If the trip is a circular trip, the method 1600 moves to step 1612. Otherwise, the method 1600 moves to step 1614. Turing to step 1612, the endpoint establishment module 705 determines whether the type of the stop is an intermediate stop. If the type of the stop is an intermediate stop, the method 1600 moves to step 1626. Otherwise, the method 1600 moves to step 1638.

Figure 16B:
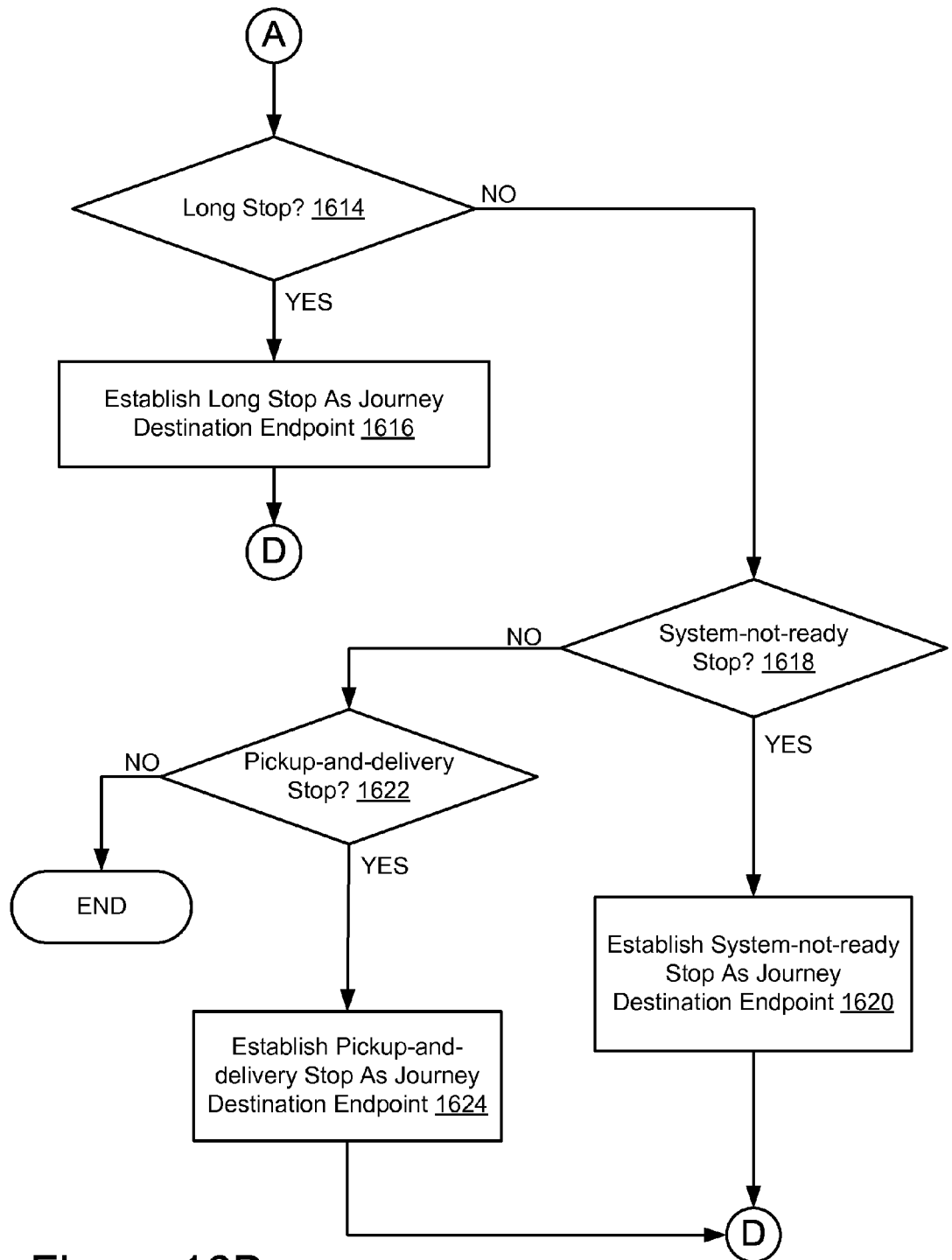

Referring now to FIG. 16B, the endpoint establishment module 705 determines 1614 whether the type of the stop is a long stop. If the type of the stop is a long stop, the endpoint establishment module 705 establishes 1616 the long stop as a journey destination endpoint and the method 1600 moves to step 1644. If the type of the stop is not a long stop, the endpoint establishment module 705 determines 1618 whether the type of the stop is a system-not-ready stop. If the type of the stop is a system-not-ready stop, the endpoint establishment module 705 establishes 1620 the system-not-ready stop as a journey destination endpoint and the method 1600 moves to step 1644.

If the type of the stop is not a system-not-ready stop, the endpoint establishment module 705 determines 1622 whether the type of the stop is a pickup-and-delivery stop. If the type of stop is not a pickup-and-delivery stop, the method 1600 ends. If the type of the stop is a pickup-and-delivery stop, the endpoint establishment module 705 establishes 1624 the pickup-and-delivery stop as a journey destination endpoint and the method 1600 moves to step 1644.

Figure 16C:
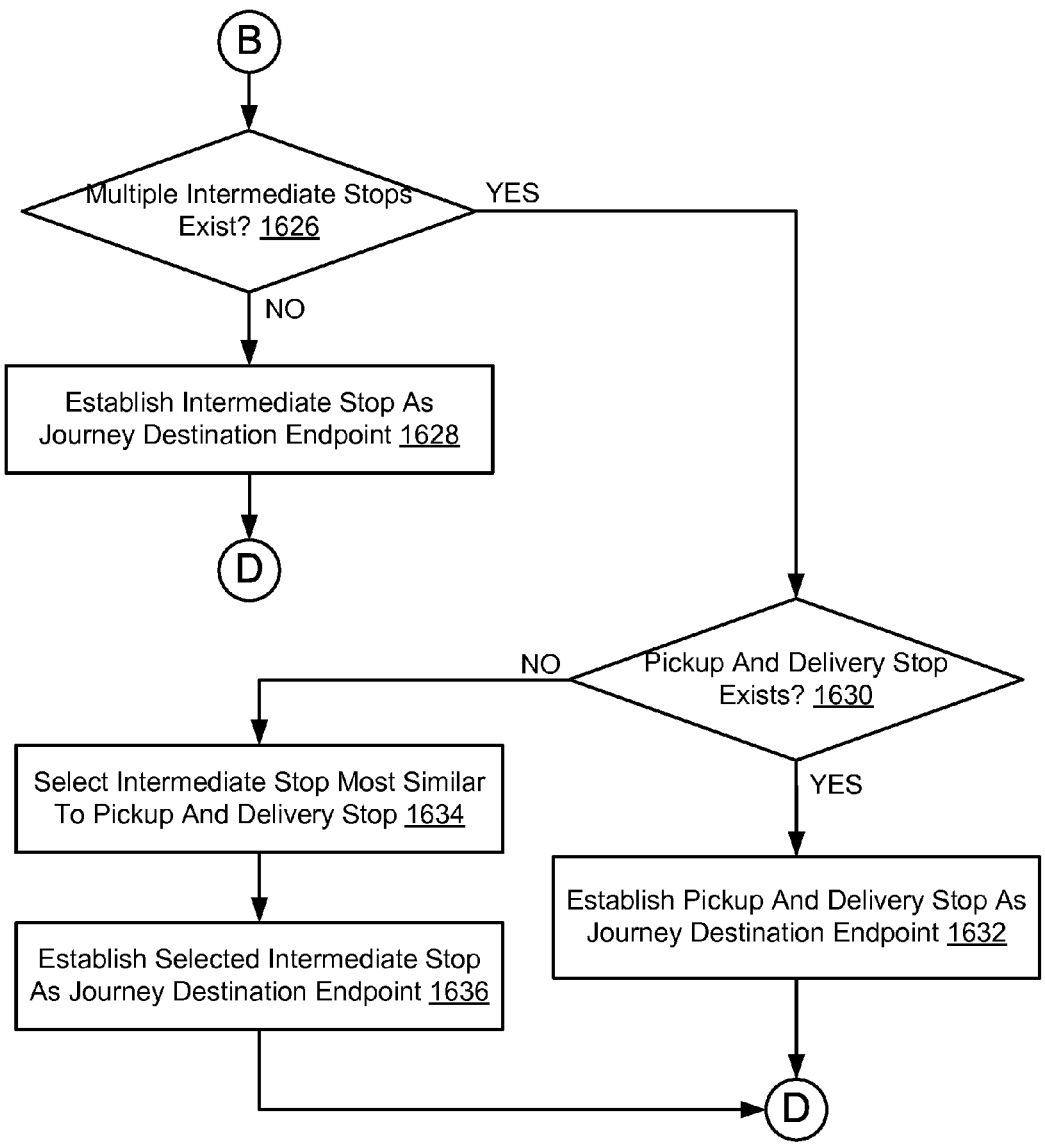

Referring now to FIG. 16C, the endpoint establishment module 705 determines 1626 whether multiple intermediate stops exist in the circular trip. If there is a single intermediate stop existing, the endpoint establishment module 705 establishes 1628 the intermediate stop as a journey destination endpoint. Otherwise, the method 1600 moves to step 1630. At step 1630, the endpoint establishment module 705 determines whether a pickup-and-delivery stop exists among the multiple intermediate stops. If there is a pickup-and-delivery stop, the endpoint establishment module 705 establishes 1632 the pickup-and-delivery stop as a journey destination endpoint and the method 1600 moves to step 1644. Otherwise, the method moves to step 1634.

Turning to step 1634, the endpoint establishment module 705 selects an intermediate stop that is most similar to a pickup-and-delivery stop based on one or more metric criteria. The endpoint establishment module 705 establishes 1636 the selected intermediate stop as a journey destination endpoint and the method 1600 moves to step 1644.

Figure 16D:
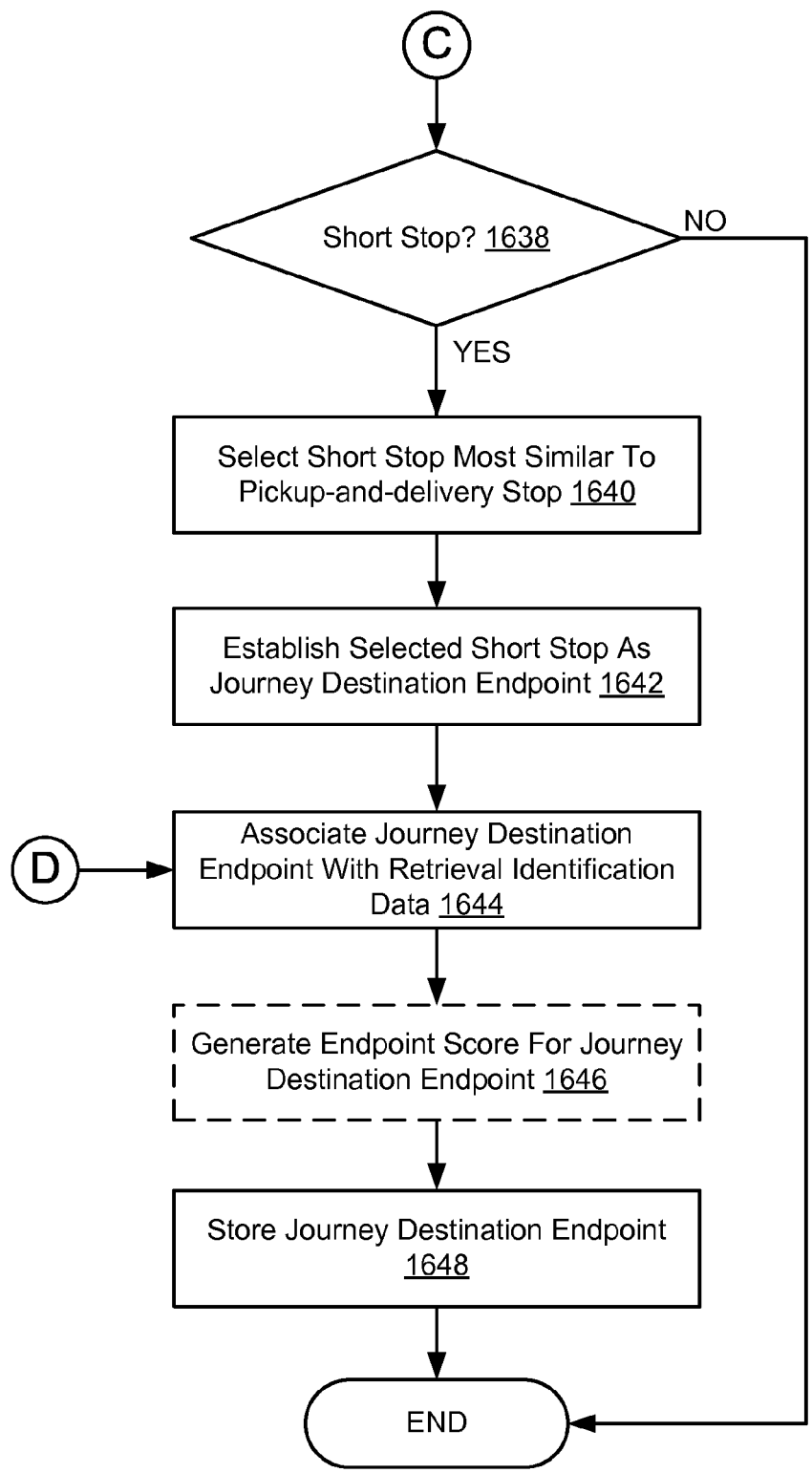

Referring now to FIG. 16D, the endpoint establishment module 705 determines 1638 whether the type of the stop is a short stop. If the type of the stop is not a short stop, the method 1600 ends. Otherwise, the method 1600 moves to step 1640. At step 1640, the endpoint establishment module 705 selects a short stop that is most similar to a pickup-and-delivery stop based on one or more metric criteria. The endpoint establishment module 705 establishes 1642 the selected short stop as a journey destination endpoint and the method 1600 moves to step 1644.

Turning to step 1644, the endpoint establishment module 705 associates the journey destination endpoint with retrieval identification data such as a retrieval ID and a user ID. Optionally, the endpoint establishment module 705 generates 1646 an endpoint score for the journey destination endpoint. The endpoint establishment module 705 stores 1648 the journey destination endpoint in the storage 118. In one embodiment, the endpoint establishment module 705 determines whether the endpoint score is above a score threshold. If the endpoint score is above the score threshold, the endpoint establishment module 705 stores the journey destination endpoint in the storage 118. If the endpoint score is below the score threshold, the endpoint establishment module 705 ignores the journey destination endpoint.

Graphical Representations

Referring now to FIGS. 17A-20, various embodiments of a graphical representation of the specification will be described. FIG. 17A is a graphical representation 1700 illustrating a metric estimation network according to one embodiment. In the illustrated embodiment, the estimation of a potential journey to a destination is based at least in part on one or more of the day of week, a previous origin from a last journey (e.g., previous origin-1), a POI type for the destination, a previous origin from a second last journey (e.g., previous origin-2), the week of year, the journey duration, the time of day, the current origin and the direction.

FIG. 17B is a graphical representation 1750 illustrating a metric estimation network according to another embodiment. In the illustrated embodiment, the estimation of a potential journey to a destination is based at least in part on one or more of the day of week, the time of day and the direction.

FIG. 18A is a graphical representation 1800 illustrating a table for converting a time of day (e.g., a time of departure) according to one embodiment. FIG. 18B is a graphical representation 1830 illustrating a table for converting a journey duration according to one embodiment. FIGS. 18A and 18B are described above with reference to FIG. 2. The description will not be repeated here.

FIG. 18C is a graphical representation 1850 illustrating a graph for converting a direction of a journey according to one embodiment. In the illustrated embodiment, since the direction 1852 lies in the "east" section, the conversion module 205 converts the direction 1852 as an "east" direction.

FIG. 19A is a graphical representation of a table 1900 listing one or more metric tables according to one embodiment. The table 1900 includes a first column listing the table names, a second column listing the table types and a third column listing the learning parameters associated with the metric tables. For example, the destination table with a table name "destTable" in a first row of the table 1900 is a probability table storing probabilities for destinations identified by the destination IDs. One skilled in the art will recognize that the table 1900 may include other metric tables for providing the functionality described herein.

FIG. 19B is a graphical representation illustrating a metric table 1910 according to one embodiment. In the illustrated embodiment, the metric table 1910 is an example of a destination table. The metric table 1910 includes one or more destinations (e.g., home, work, gym, gas station) and one or more occurring frequencies for the one or more destinations. For example, the occurring frequency for the "work" destination is thirty times and the occurring frequency for the "home" destination is forty times.

FIG. 19C is a graphical representation illustrating a metric table 1920 according to another embodiment. In the illustrated embodiment, the metric table 1920 is an example of a "todTable" listed in FIG. 19A. The metric table 1920 lists the occurring frequency for each destination at a given time of day. For example, given that the time of day is morning, the occurring frequency for the "work" destination is twenty-eight times, the occurring frequency for the "gym" destination is three times and the occurring frequencies for the "home" and "gas station" destinations are zero.

FIG. 19D is a graphical representation illustrating a metric table 1930 according to yet another embodiment. In the illustrated embodiment, the metric table 1930 is an example of a destination table "destTable" as listed in FIG. 19A. The metric table 1930 includes one or more destinations (e.g., home, work, gym, gas station) and one or more probabilities for the one or more destinations. For example, the probability for the "work" destination is 0.3 and the probability for the "home" destination is 0.4.

Figure 20:
FIG. 20 is a graphical representation illustrating a table for summarizing different types of a stop according to one embodiment.

FIG. 20 is a graphical representation illustrating a table 2000 for summarizing different types of a stop according to one embodiment. The table 2000 includes a system-not-ready stop, a short stop, an intermediate stop, a pickup-and-delivery stop and a long stop. One skilled in the art will recognize that the table 2000 may include other types of a stop.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
receiving a stream of data from a global positioning system (GPS), the steam of data including a first data element describing a first geographic position and a first timestamp of a traveling vehicle and a second data element describing a second geographic position and a second timestamp of the traveling vehicle;
receiving a set of sensor data from one or more sensors of the traveling vehicle, the set of sensor data describing a traveling status of the traveling vehicle;
detecting a stop for the traveling vehicle based at least in part on the stream of data and the set of sensor data;
applying one or more metric criteria associated with the traveling status of the traveling vehicle to the first data element and the second data element to determine a type of the stop;
determining that the stop is a journey destination endpoint based at least in part on the type of the stop; and
associating the journey destination endpoint with retrieval identification data.

2. The method of claim 1 further comprising:
accessing a group including history data including one or more historical data elements describing one or more past geographic positions and one or more past timestamps for one or more past journeys;
comparing the first data element and the second data element with a time constraint and a distance constraint to determine whether the first data element and the second data element satisfy the time constraint and the distance constraint; and
adding the first data element and the second element to the group based on a determination that the first data element and the second data element satisfy the time constraint and the distance constraint.

3. The method of claim 1 further comprising:
generating an endpoint score for the journey destination endpoint;
determining whether the endpoint score is above a score threshold; and
storing the journey destination endpoint responsive to the determination that the endpoint score is above the score threshold.

4. The method of claim 1, wherein the steam of data is stored in a GPS log.

5. The method of claim 1, wherein the second data element immediately follows the first data element in the stream of data.

6. The method of claim 1, wherein the retrieval identification data is data describing a retrieval identifier and a user identifier for the journey destination endpoint.

7. The method of claim 1 further comprising:
reporting the journey destination endpoint to a social network application.

8. A computer program product comprising a non-transitory computer readable medium encoding instructions that, in response to execution by a computing device, cause the computing device to perform operations comprising:
receiving a stream of data from a global positioning system (GPS), the steam of data including a first data element describing a first geographic position and a first timestamp of a traveling vehicle and a second data element describing a second geographic position and a second timestamp of the traveling vehicle;
receiving a set of sensor data from one or more sensors of the traveling vehicle, the set of sensor data describing a traveling status of the traveling vehicle;
detecting a stop for the traveling vehicle based at least in part on the stream of data and the set of sensor data;
applying one or more metric criteria associated with the traveling status of the traveling vehicle to the first data element and the second data element to determine a type of the stop;
determining that the stop is a journey destination endpoint based at least in part on the type of the stop; and
associating the journey destination endpoint with retrieval identification data.

9. The computer program product of claim 8, wherein the instructions cause the computing device to perform operations further comprising:
accessing a group including one or more historical data elements describing one or more past geographic positions and one or more past timestamps for one or more past journeys;
comparing the first data element and the second data element with a time constraint and a distance constraint to determine whether the first data element and the second data element satisfy the time constraint and the distance constraint; and
adding the first data element and the second element to the group based on a determination that the first data element and the second data element satisfy the time constraint and the distance constraint.

10. The computer program product of claim 8 further comprising:
generating an endpoint score for the journey destination endpoint;
determining whether the endpoint score is above a score threshold; and
storing the journey destination endpoint responsive to the determination that the endpoint score is above the score threshold.

11. The computer program product of claim 8, wherein the steam of data is stored in a GPS log.

12. The computer program product of claim 8, wherein the second data element immediately follows the first data element in the stream of data.

13. The computer program product of claim 8, wherein the retrieval identification data is data describing a retrieval identifier and a user identifier for the journey destination endpoint.

14. The computer program product of claim 8, wherein the instructions cause the computing device to perform operations further comprising:
reporting the journey destination endpoint to a social network application.

15. A system comprising:
a communication module receiving a stream of data from a global positioning system (GPS), the communication module receiving a set of sensor data from one or more sensors of the traveling vehicle, the set of sensor data describing a traveling status of the traveling vehicle, the steam of data including a first data element describing a first geographic position and a first timestamp of a traveling vehicle and a second data element describing a second geographic position and a second timestamp of the traveling vehicle;

a stop classification module communicatively coupled to the communication module, the stop classification module detecting a stop for the traveling vehicle based at least in part on the stream of data and the set of sensor data, the stop classification module applying one or more metric criteria associated with the traveling status of the traveling vehicle to the first data element and the second data element to determine a type of the stop; and an endpoint establishment module communicatively coupled to the communication module and the stop classification module, the endpoint establishment module determining that the stop is a journey destination endpoint based at least in part on the type of the stop, the endpoint establishment module associating the journey destination endpoint with retrieval identification data.

16. The system of claim 15 further comprising:

a group module communicatively coupled to the communication module, the group module accessing a group including history data including one or more historical data elements describing one or more past geographic positions and one or more past timestamps for one or more past journeys, the group module comparing the first data element and the second data element with a time constraint and a distance constraint to determine whether the first data element and the second data element satisfy the time constraint and the distance constraint, the group module adding the first data element and the second element to the group based on a determination that the first data element and the second data element satisfy the time constraint and the distance constraint.

17. The system of claim 15, wherein the endpoint establishment module is further configured to:

generate an endpoint score for the journey destination endpoint;

determine whether the endpoint score is above a score threshold; and store the journey destination endpoint responsive to the determination that the endpoint score is above the score threshold.

18. The system of claim 15, wherein the second data element immediately follows the first data element in the stream of data.

19. The system of claim 15, wherein the retrieval identification data is data describing a retrieval identifier and a user identifier for the journey destination endpoint.

20. The system of claim 15 further comprising:

a report module communicatively coupled to the endpoint establishment module, the report module reporting the journey destination endpoint to a social network application.

21. The method of claim 1, wherein the sensor data describes one or more door activities associated with the traveling vehicle.

22. The computer program product of claim 8, wherein the sensor data describes one or more door activities associated with the traveling vehicle.

23. The system of claim 15, wherein the sensor data describes one or more door activities associated with the traveling vehicle.

* * * * *